United States Patent
Ozawa et al.

(10) Patent No.: US 9,053,074 B2
(45) Date of Patent: Jun. 9, 2015

(54) COMPUTER PRODUCT, WRITING CONTROL METHOD, WRITING CONTROL APPARATUS, AND SYSTEM

(75) Inventors: Toshihiro Ozawa, Yokohama (JP); Kazutaka Ogihara, Hachioji (JP); Yasuo Noguchi, Kawasaki (JP); Tatsuo Kumano, Kawasaki (JP); Masahisa Tamura, Kawasaki (JP); Yoshihiro Tsuchiya, Yokohama (JP); Takashi Watanabe, Kawasaki (JP); Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 13/588,415

(22) Filed: Aug. 17, 2012

(65) Prior Publication Data
US 2013/0111165 A1    May 2, 2013

(30) Foreign Application Priority Data
Oct. 27, 2011 (JP) ................................. 2011-236080

(51) Int. Cl.
G06F 12/00    (2006.01)
G06F 11/20    (2006.01)

(52) U.S. Cl.
CPC ........ *G06F 11/2089* (2013.01); *G06F 11/2092* (2013.01)

(58) Field of Classification Search
USPC .......................................................... 711/162
See application file for complete search history.

(56) References Cited

U.S. PATENT DOCUMENTS

| 7,124,244 B2 | 10/2006 | Shimada |
| 7,730,257 B2 * | 6/2010 | Franklin ........................ 711/114 |
| 2008/0109589 A1 * | 5/2008 | Honda .......................... 711/103 |
| 2011/0191522 A1 * | 8/2011 | Condict et al. ................ 711/103 |

FOREIGN PATENT DOCUMENTS

| JP | 09-146842 A | 6/1997 |
| JP | 2005-044010 A | 2/2005 |

* cited by examiner

*Primary Examiner* — Matthew Bradley
(74) *Attorney, Agent, or Firm* — Fujitsu Patent Center

(57) ABSTRACT

A computer-readable recording medium stores a program that causes a computer to execute a writing control process that includes receiving a writing request to write a first data to a first storage apparatus; determining a second data from among a series of data and based on a writing sequence of the series of data written to the computer and a count of storage areas at a second storage apparatus that sequentially selects from among the storage areas when data is received, a storage area to be over written by the received data, where the second data is written to the first storage apparatus and is identical to data that is stored in the storage area to be selected next at the second storage apparatus; and transmitting copy data of the first data to the second storage apparatus, when the second data has been written to the first storage apparatus.

11 Claims, 20 Drawing Sheets

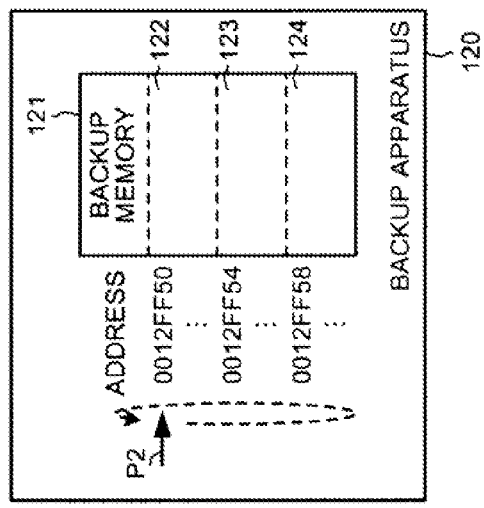
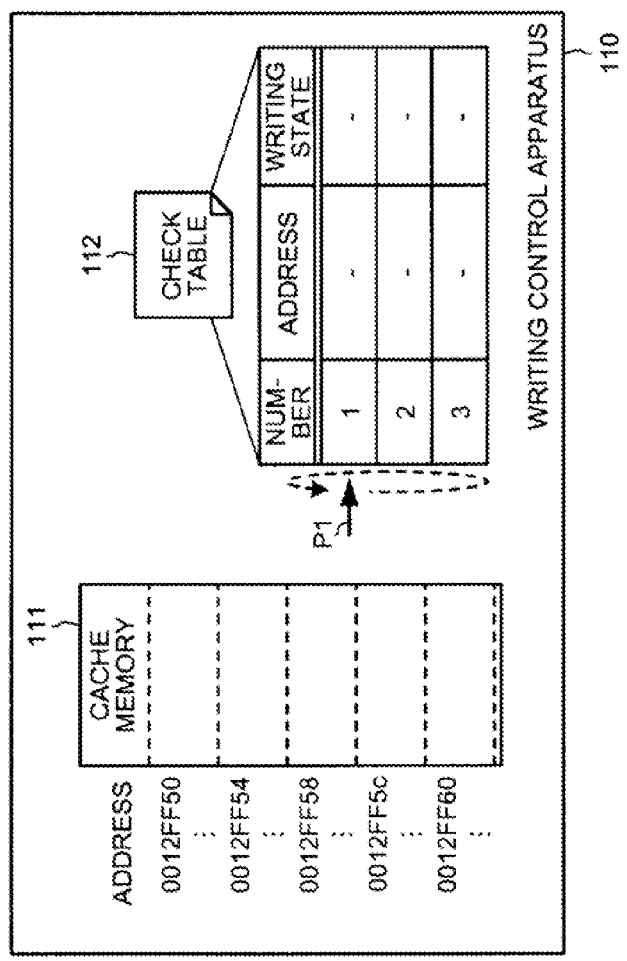
FIG.9

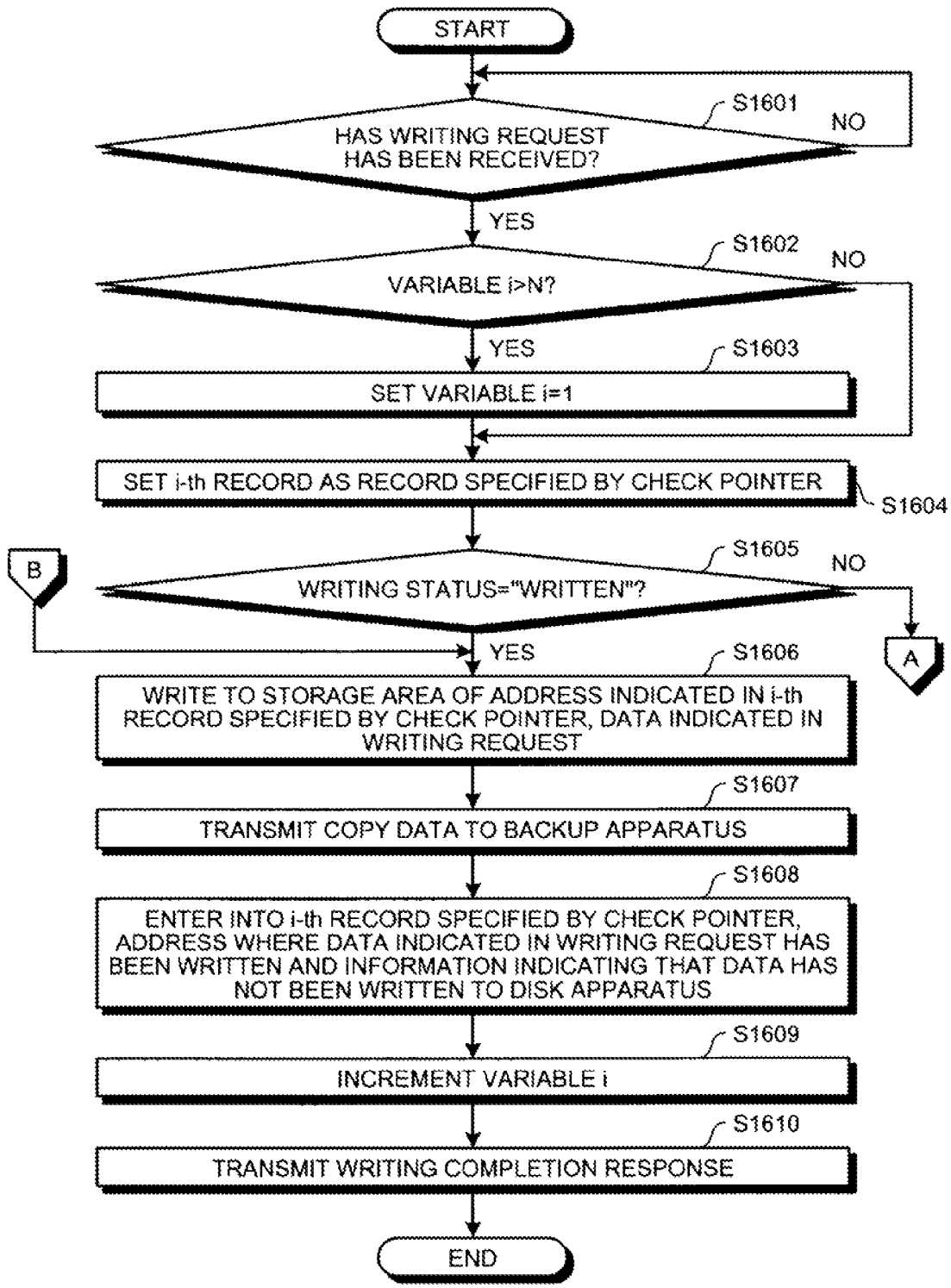

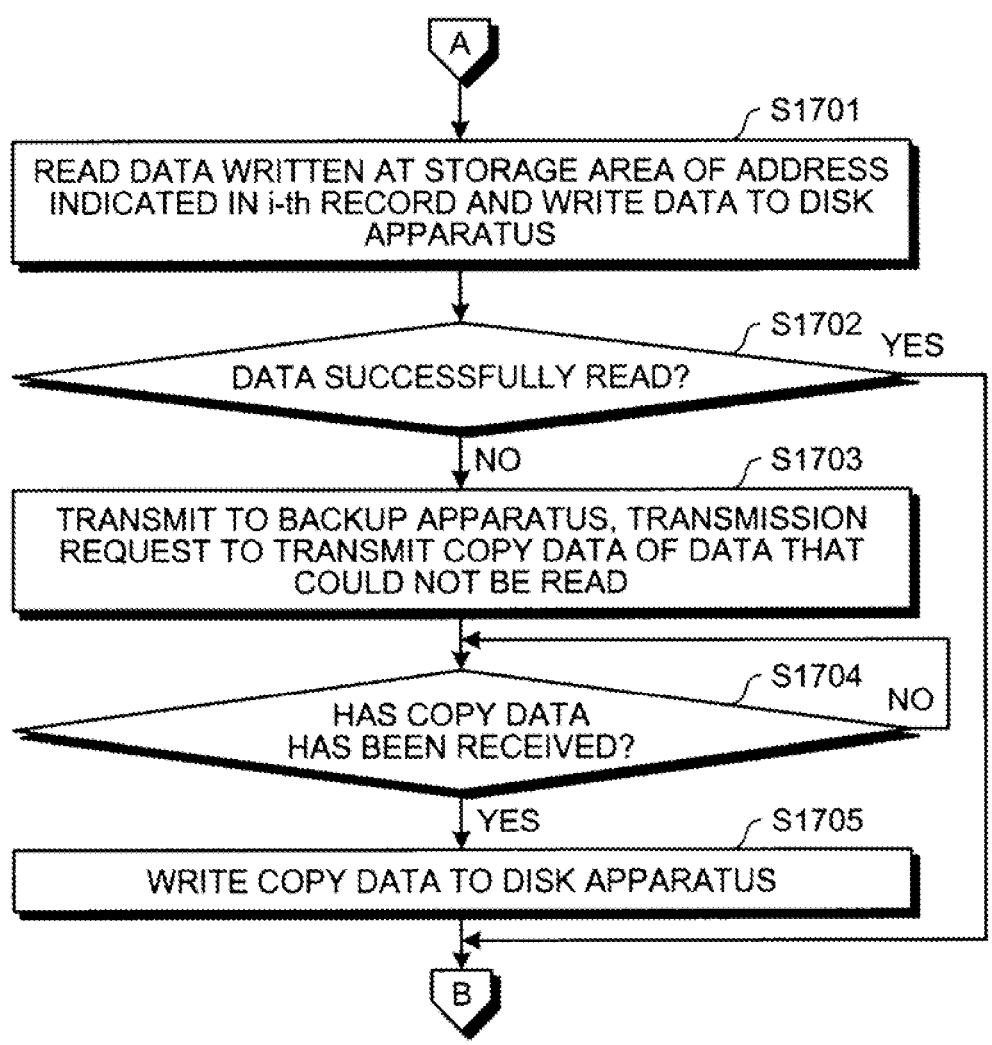

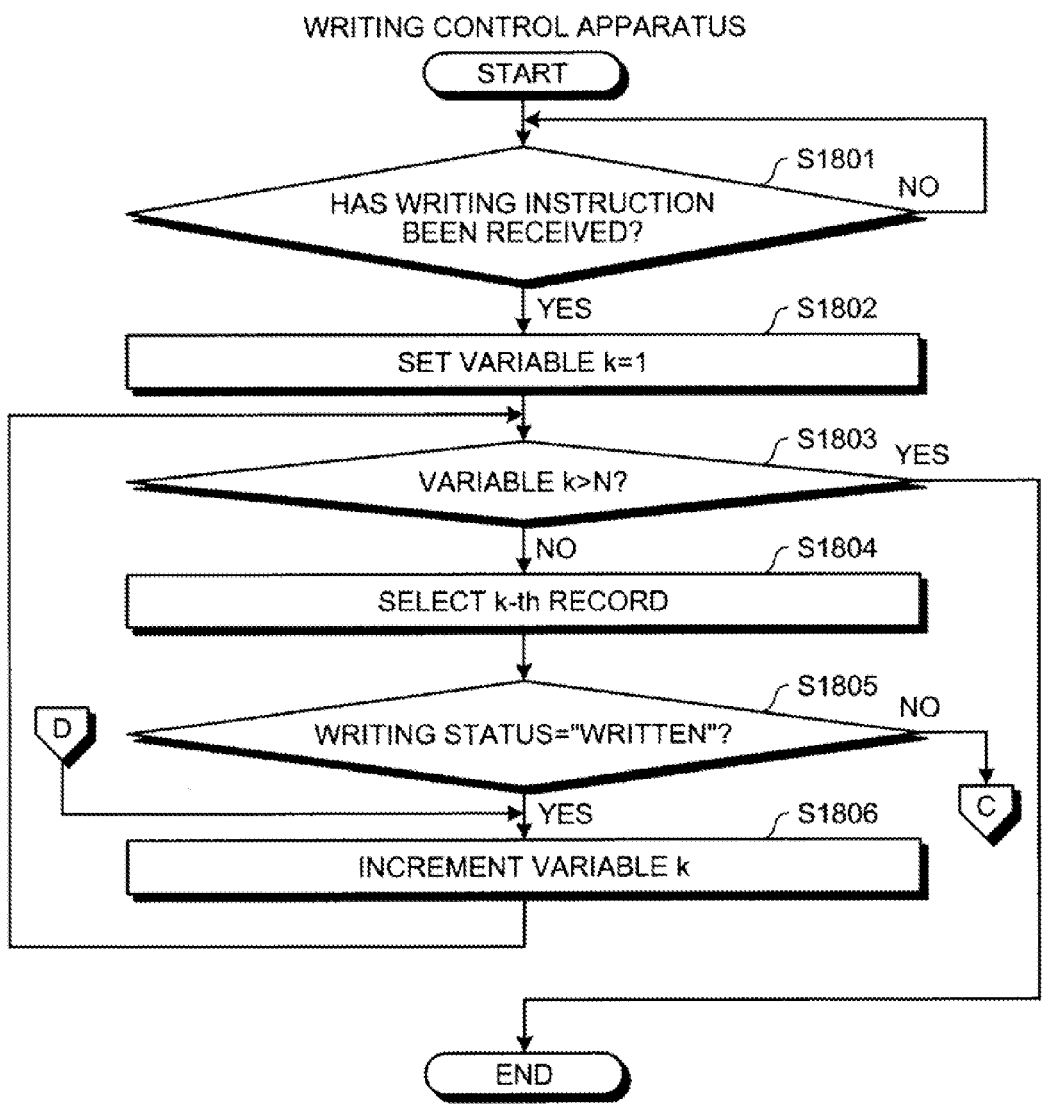

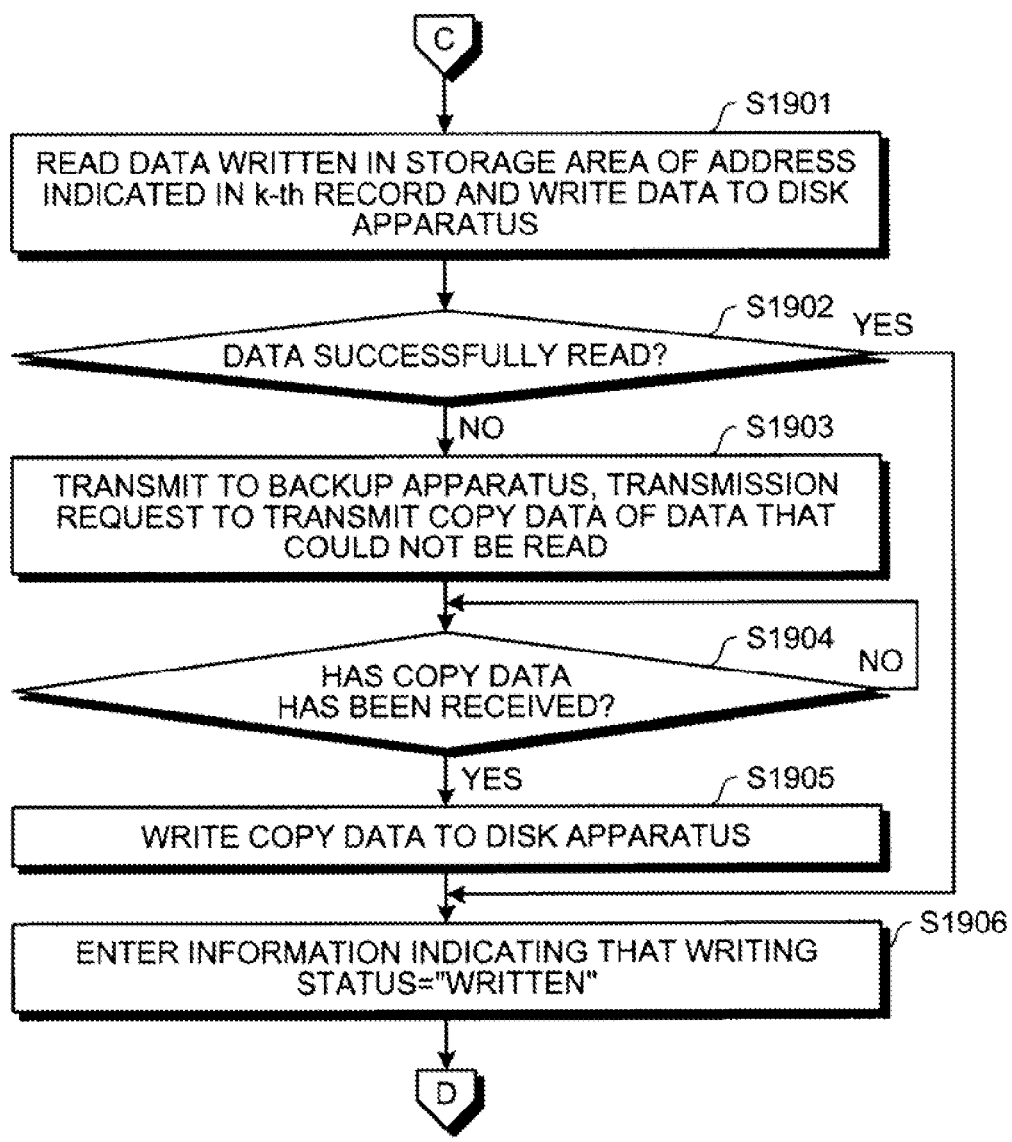

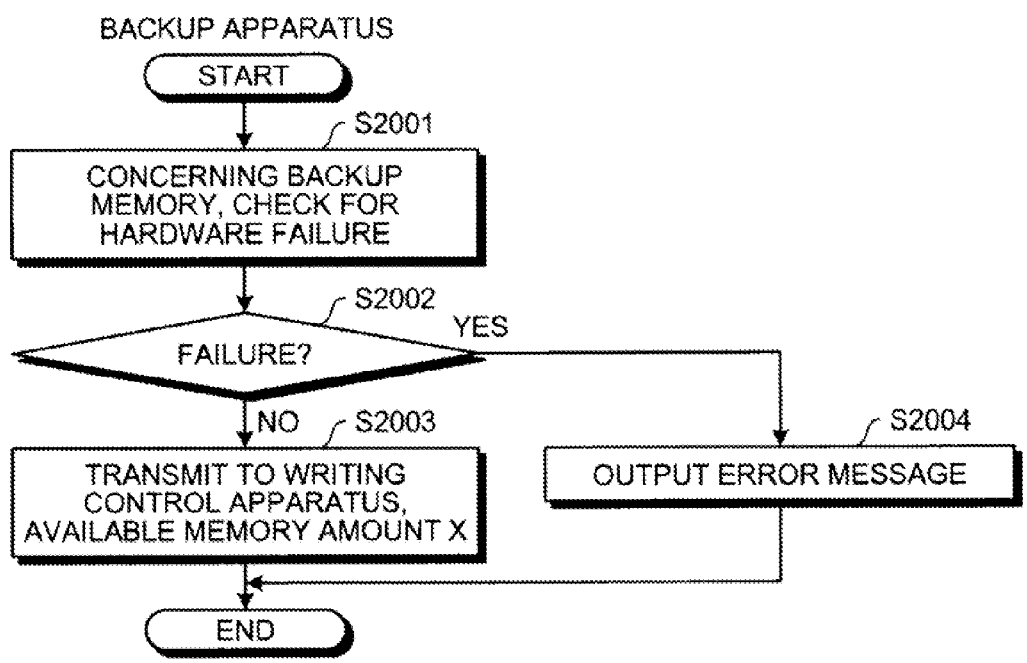

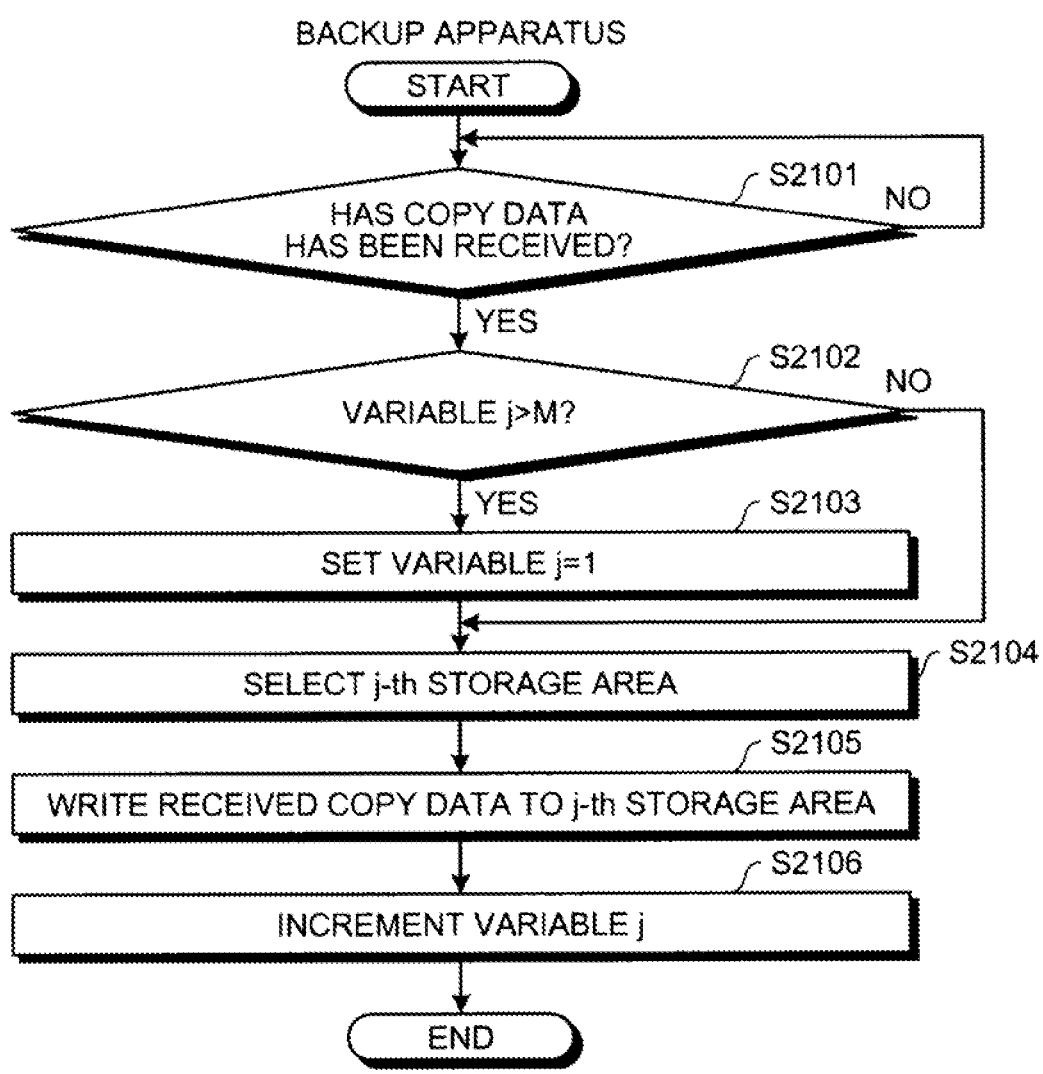

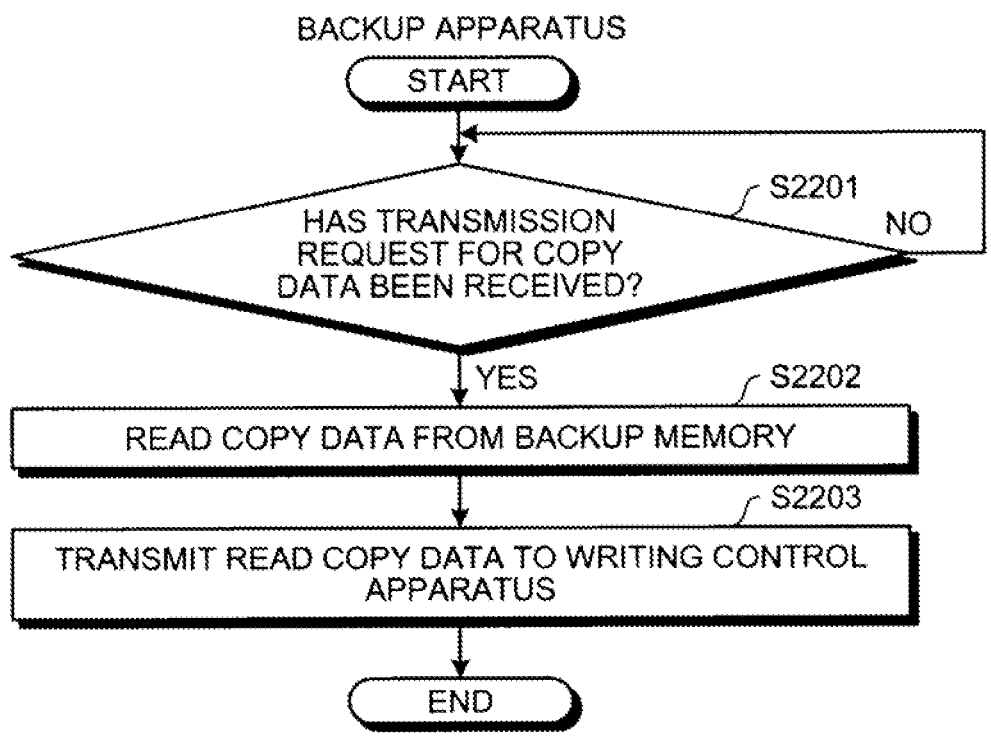

ND SYSTEM

COMPUTER PRODUCT, WRITING CONTROL METHOD, WRITING CONTROL APPARATUS, AND SYSTEM

CROSS REFERENCE TO RELATED APPLICATIONS

This application is based upon and claims the benefit of priority of the prior Japanese Patent Application No. 2011-236080, filed on Oct. 27, 2011, the entire contents of which are incorporated herein by reference.

FIELD

The embodiments discussed herein are related to a writing control program, a writing control method, a writing control apparatus, and a system.

BACKGROUND

Conventionally, in storage systems, when a storage apparatus receives a request to write data to a disk, the storage apparatus first writes the data to memory prior to writing the data to the disk and thereafter, responds to the writing request, whereby improved response performance is facilitated. Thus, actual writing to the disk is performed after writing to memory.

On the other hand, until writing to the disk is performed, the data is only on the memory and during this time, if an abnormal event occurs at the memory, the data is at risk of being lost. Therefore, a backup apparatus that duplicates and manages the data that is only on the memory, is separately prepared.

For example, the storage apparatus performs data backup by transmitting to the backup apparatus, a backup of the data held in the memory. Since available areas will become insufficient if the backup data continues to accumulate in the memory, the backup apparatus, in response to a backup data deletion request from the storage apparatus, releases storage areas to which the backup data is written.

A related conventional technology has duplicate controllers performing writing to a disk and the respective caches of the controllers are mutually duplicated (see, for example, Japanese Laid-Open Patent Publication No. H9-146842). Further, a technology, when cache has been duplicated, writes data to one cache and responds to a writing request; and thereafter, writes the data to another cache (see, for example, Japanese Laid-Open Patent Publication No. 2005-44010).

However, with the technology above, a problem arises in that increases in the volume of communication between the storage apparatus and the backup apparatus are invited since requests to delete backup data are transmitted from the storage apparatus to the backup apparatus.

SUMMARY

According to an aspect of an embodiment, a computer-readable recording medium stores a program that causes a computer to execute a writing control process that includes receiving a writing request to write a first data to a first storage apparatus; determining a second data from among a series of data and based on a writing sequence of the series of data written to the computer consequent to writing requests before the writing request for the first data and a count of storage areas at a second storage apparatus that sequentially selects from among the storage areas when data is received, a storage area to be over written by the received data, wherein the second data is to be written to the first storage apparatus and is identical to data that is stored in the storage area to be selected next at the second storage apparatus; and transmitting copy data of the first data to the second storage apparatus, when the determined second data has been written to the first storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9, 10, 11, 12, 13, and 14 are diagrams depicting contents of writing control processing performed by the writing control apparatus 110 to write data to a disk apparatus 140;

FIGS. 16 and 17 are flowcharts depicting one example of a first writing control process of the writing control apparatus 110 according to the embodiment;

FIGS. 18 and 19 are flowcharts depicting one example of a second writing control process of the writing control apparatus 110 according to the embodiment;

FIG. 20 is a flowchart depicting one example of a startup process by the backup apparatus 120 according to the embodiment;

FIG. 21 is a flowchart depicting one example of a copy data writing process by the backup apparatus 120; and FIG. 22 is a flowchart depicting one example of a copy data transmission process by the backup apparatus 120 according to the embodiment.

DESCRIPTION OF EMBODIMENTS

Preferred embodiments of a writing control program, a writing control method, a writing control apparatus, and a system will be explained with reference to the accompanying drawings.

Figure 1:
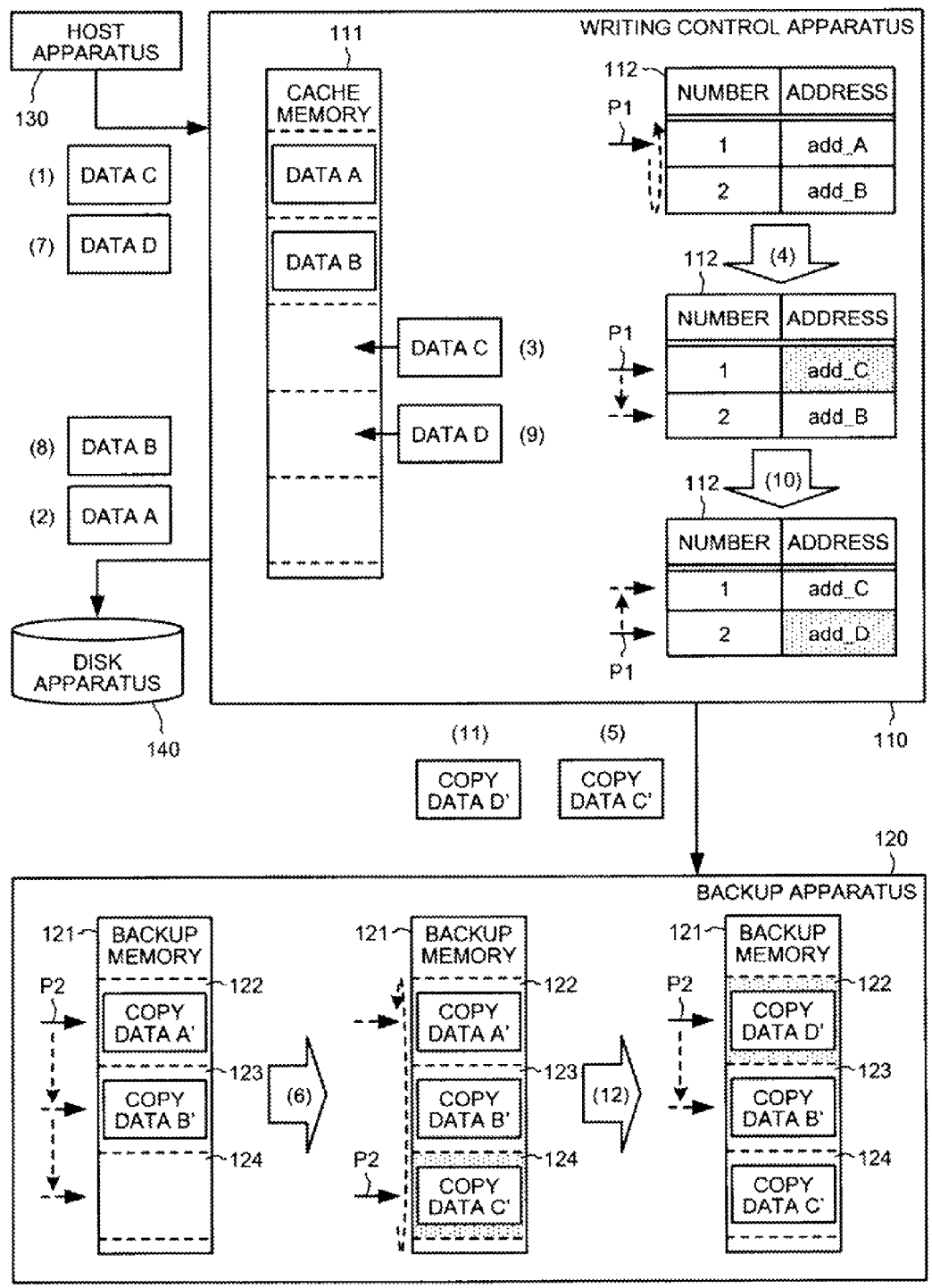
FIG. 1 is a diagram of a first example of a writing control method according to an embodiment.
Figure 2:
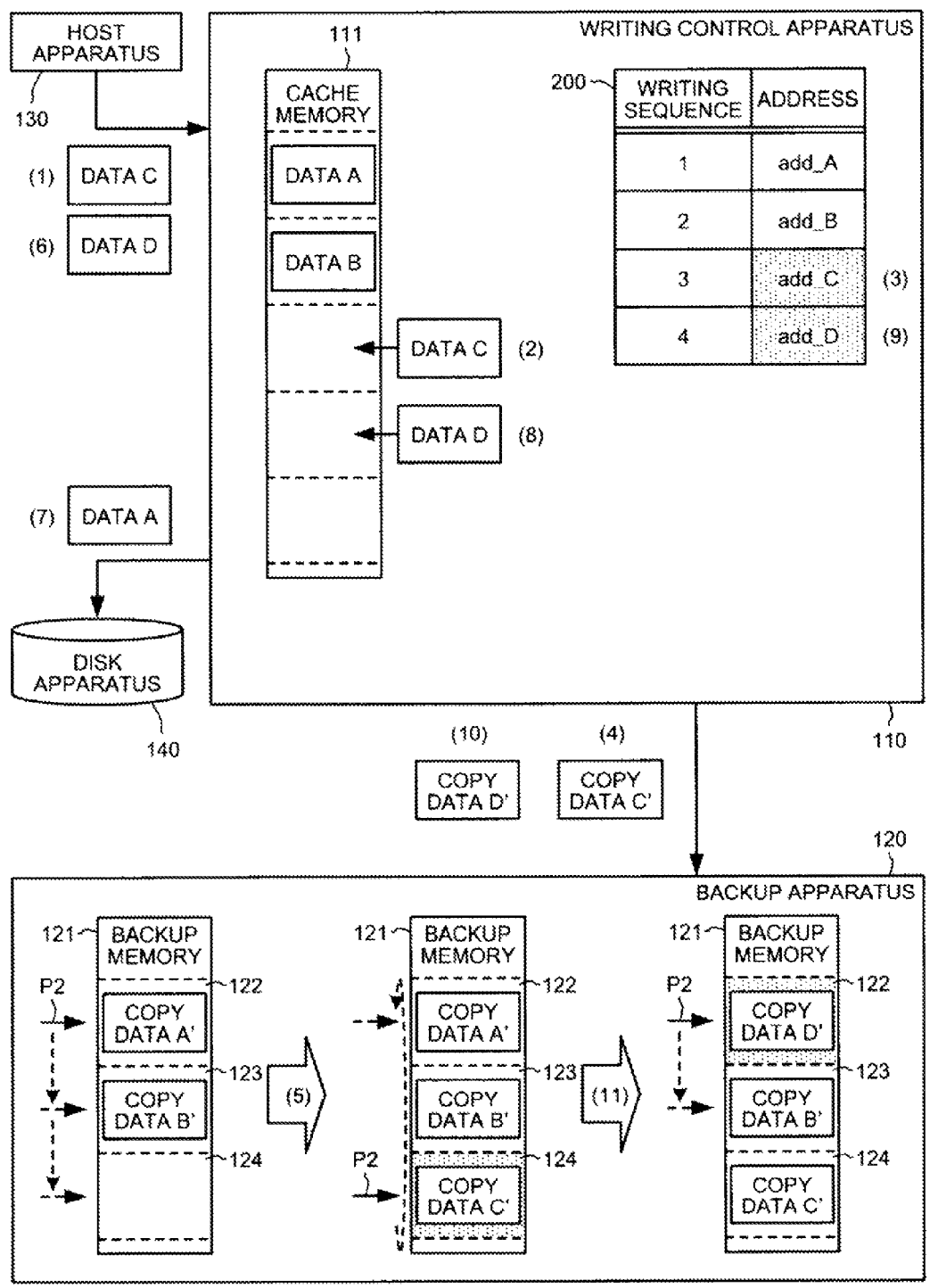
FIG. 2 is a second diagram of the first example of the writing control method according to the embodiment.

With reference to FIGS. 1 and 2, a writing control method according to an embodiment will be described.

FIG. 1 is a diagram of a first example of the writing control method according to the embodiment. In FIG. 1, a writing control apparatus 110 is a computer that has access to a disk apparatus 140 and receives from a host apparatus 130, data writing requests to write data to the disk apparatus 140. The host apparatus 130 is a computer that transmits to the writing control apparatus 110, data writing requests to write data to the disk apparatus 140.

Upon receiving from the host apparatus 130, a data writing request to write data to the disk apparatus 140, the writing control apparatus 110 writes the data to cache memory 111 and transmits to the host apparatus 130, a response to the writing request, prior to writing the data to the disk apparatus 140. As a result, response performance with respect to data writing requests from the host apparatus 130 can be improved.

The writing control apparatus 110 has a check table 112. The check table 112 stores the addresses of a first to an N-th (N is a natural number of 1 or greater) storage area included in the cache memory 111. In the example depicted in FIG. 1, the addresses of the first to the second storage areas are stored (N=2).

The writing control apparatus 110 refers to the check table 112, and from among the first to the second storage areas included in the cache memory 111, sequentially selects an i-th storage area (i=1, 2, . . . , N) to which data indicated in a writing request for the disk apparatus 140 is written. Further, the writing control apparatus 110 next selects the first storage area subsequent to the N-th storage area, whereby the first to the N-th storage areas are cyclically selected.

The selected storage area, for example, can be identified by a check pointer P1 identifying the i-th record in the check table 112. The number "i" of the record identified by the check pointer P1 is, for example, incremented each time data indicated in a writing request is written to the cache memory 111.

However, when the number "i" becomes "i=N+1" consequent to incrementing, the writing control apparatus 110 sets the number "i" of the record specified by the check pointer P1 to "i=1". In the example depicted in FIG. 1, when the number "i" becomes "i=3", the number "i" of record specified by the check pointer P1 becomes "i=1".

Thus, the writing control apparatus 110 can sequentially select the first to the N-th storage areas in the cache memory 111 by selecting the storage area of the address indicated in the record specified by the check pointer P1. In the example depicted in FIG. 1, the first to the second storage areas in the cache memory 111 can be sequentially selected.

The writing control apparatus 110 writes to the disk apparatus 140, the data written in the storage area of the address indicated in the selected i-th record. Further, the writing control apparatus 110 transmits to a backup apparatus 120, copy data of the data indicated in the writing request. Copy data is a copy of the data indicated in a writing request.

The backup apparatus 120 is a computer that receives copy data from the writing control apparatus 110. Further, the backup apparatus 120 has backup memory 121 to which the received copy data is written. The backup memory 121 includes a first to an M-th (M is a natural number greater than or equal to N) storage area. In the example depicted in FIG. 1, the backup memory 121 includes a first to a third storage area 122 to 124.

The backup apparatus 120, from among the first to the M-th storage areas in the backup memory 121, sequentially selects a j-th (j=1, 2, . . . , M) storage area to which copy data is written. Further, the backup apparatus 120 next selects the first storage area subsequent to the M-th storage area, whereby the first to the M-th storage areas are cyclically selected.

The selected storage area, for example, can be identified by a write pointer P2 identifying the j-th storage area. The number "j" of the storage area identified by the write pointer P2 is, for example, incremented each time copy data is written to the backup memory 121.

However, when the number "j" becomes "j=M+1" consequent to incrementing, the backup apparatus 120 sets the number "j" of the storage area specified by the write pointer P2 to "j=1". In the example depicted in FIG. 2, when the number "j" becomes "j=4", the number "j" of the record specified by the write pointer P2 becomes "j=1".

Thus, the writing control apparatus 110 can sequentially select the first to the N-th storage areas in the cache memory 111 by selecting the storage area of the address indicated in the record specified by the check pointer P1. In the example depicted in FIG. 1, the first to the second storage areas in the cache memory 111 can be sequentially selected.

The writing control apparatus 110 writes to the disk apparatus 140, the data written in the storage area of the address indicated in the selected i-th record. Further, the writing control apparatus 110 transmits to the backup apparatus 120, copy data of the data indicated in a writing request. Copy data is a copy of the data indicated in a writing request.

The backup apparatus 120 is a computer that receives copy data from the writing control apparatus 110. Further, the backup apparatus 120 has backup memory 121 to which the received copy data is written. The backup memory 121 includes a first to an M-th (M is a natural number greater than or equal to N) storage area. In the example depicted in FIG. 1, the backup memory 121 includes a first to a third storage area 122 to 124.

The backup apparatus 120, from among the first to the M-th storage areas in the backup memory 121, sequentially selects a j-th (j=1, 2, . . . , M) storage area to which copy data is written. Further, the backup apparatus 120 next selects the first storage area subsequent to the M-th storage area, whereby the first to the M-th storage areas are cyclically selected.

The selected storage area, for example, can be identified by a write pointer P2 identifying the j-th storage area. The number "j" of the storage area identified by the write pointer P2 is, for example, incremented each time copy data is written to the backup memory 121.

However, when the number "j" becomes "j=M+1" consequent to incrementing, the backup apparatus 120 sets the number "j" of the storage area specified by the write pointer P2 to "j=1". In the example depicted in FIG. 2, when the number "j" becomes "j=4", the number "j" of the record specified by the write pointer P2 becomes "j=1".

Thus, the backup apparatus 120 can sequentially select the first to the M-th storage areas in the backup memory by selecting the storage area identified by the write pointer P2. In the example depicted in FIG. 2, the first to the third storage areas 122 to 124 in the backup memory 121 are sequentially selected. Further, the backup apparatus 120 writes the copy data to the selected j-th storage area.

In the example depicted in FIG. 1, at the writing control apparatus 110, data A and data B indicated in a writing request from the host apparatus 130 are written to the cache memory 111. Consequently, the check pointer P1 specifies the first record in the check table 112. Further, at the backup apparatus, copy data A' of data A is written to the storage area 122 of the backup memory 121 and copy data B' of data B is written to the storage area 123 of the backup memory 121. Consequently, the write pointer P2 specifies the third storage area in the backup memory 121.

Here, a case where the writing control apparatus 110 receives a writing request for data C and a case where the writing control apparatus 110 receives a writing request for data D will be described.

(1) The writing control apparatus 110 receives from the host apparatus 130, a writing request to write data C to the disk apparatus 140.

(2) The writing control apparatus 110, upon receiving the writing request for data C, writes to the disk apparatus 140, data A, which is written in the storage area of the address "add_A" indicated in the first record specified by the check pointer P1.

(3) The writing control apparatus 110, upon writing data A to the disk apparatus 140, writes data C to the cache memory 111. For example, the writing control apparatus 110 writes data C to an available area in the cache memory 111.

(4) The writing control apparatus 110 changes the address "add_A" in the first record specified by the check pointer P1 to the address "add_C" where data C is written, and changes the record specified by the check pointer P1 to the second record.

(5) The writing control apparatus 110 transmits copy data C' of data C to the backup apparatus 120.

(6) The backup apparatus 120, upon receiving copy data C', writes copy data C' to the storage area 124 (third storage area) specified by the write pointer P2, and returns the storage area specified by the write pointer P2 to the storage area 122 (first storage area).

(7) The writing control apparatus 110 receives a writing request to write data D to the disk apparatus 140.

(8) The writing control apparatus 110, upon receiving the writing request for data D, writes to the disk apparatus 140, data B, which is written in the storage area of the address "add_B" indicated in the second record specified by the check pointer P1.

(9) The writing control apparatus 110, upon writing data B to the disk apparatus 140, writes data D to the cache memory 111. For example, the writing control apparatus 110 writes data D to an available area in the cache memory 111.

(10) The writing control apparatus 110 changes the address "add_B" in the second record specified by the check pointer P1 to the address "add D", where data D is written, and returns the record specified by the check pointer P1 to the first record.

(11) The writing control apparatus 110 transmits copy data D' of data D to the backup apparatus 120.

(12) The backup apparatus 120, upon receiving copy data D', writes copy data D' to the storage area 122 (first storage area) specified by the write pointer P2, and changes the storage area specified by the write pointer P2 to the storage area 123 (second storage area).

Here, at the backup apparatus 120, although copy data A' is over-written by copy data D', data A (the source of copy data A') has already been written to the disk apparatus 140 and no longer requires backup.

Thus, the backup apparatus 120 sequentially and cyclically selects M storage areas to which copy data is to be written and by writing copy data thereto, the copy data written thereto at the previous cycle is over written by new copy data. Further, the writing control apparatus 110 sequentially and cyclically selects N storage areas (N being less than or equal to M) from which data is read and writes the read data to the disk apparatus 140.

The original data that is the source of copy data to be over written by the backup apparatus 120 may be written to the disk apparatus 140 at an arbitrary time that is favorable for the writing control apparatus 110. For example, when writing data A to the disk apparatus 140, if also writing data B is more favorable for the writing control apparatus 110, the writing control apparatus 110 writes data A and data B together and changes the writing status of data B in the check table 112 to "written".

Therefore, the original data can be written to the disk apparatus 140 by the writing control apparatus 110 before the copy data is over written by the backup apparatus 120. At the backup apparatus 120, with the original data already being written to the disk apparatus 140, copy data that has become unnecessary can be over written by new copy data transmitted from the writing control apparatus 110.

Consequently, the writing control apparatus 110 need not perform processing to transmit a copy data deletion request to the backup apparatus 120 when data backup has become unnecessary. As a result, the writing control apparatus 110 suppresses the volume of processing at the writing control apparatus 110 and suppresses the volume of communication with the backup apparatus 120.

Consequent to the backup apparatus 120 over writing copy data that no longer requires backup (the copy data being over written with new copy data), the writing control apparatus 110 can suppress the size of the storage area used in the backup memory 121 for writing copy data. Further, until the data in the cache memory 111 is written to the disk apparatus 140 by the writing control apparatus 110, the copy data of the data can be saved at the backup apparatus 120, without being over written.

Although the number of the record specified by the check pointer P1 is described to be incremented at each record update, configuration is not limited hereto. For example, the number of the record specified by the check pointer P1 may be incremented at each reception of a data writing request from the host apparatus 130.

Although data indicated in a writing request is described to be written to an available area in the cache memory 111, configuration is not limited hereto. For example, the addresses of the first to the N-th storage areas may be fixed and data may be over written at the storage area of a fixed address. As a result, the writing control apparatus 110 can efficiently utilize the storage areas of the cache memory 111.

A case where the writing control apparatus 110 uses a writing sequence table 200 to execute writing control processing will be described. Description of components identical to those described with reference to FIG. 1 will be omitted.

FIG. 2 is a second diagram of the first example of the writing control method according to the embodiment. In FIG. 2, the writing control apparatus 110 has the writing sequence table 200 storing the writing sequence of data written to the cache memory 111.

The writing control apparatus 110 refers to the writing sequence table 200 and the number of storage areas M that the backup apparatus 120 has (the M storage areas being storage areas to which copy data is to be written) and identifies the original data of the copy data to be written next by the backup apparatus 120. For example, as the original data of the copy data to be written next by the backup apparatus 120, the writing control apparatus 110 identifies the data written to the cache memory 111 M writings before.

The writing control apparatus 110 determines the identified data to be data that is to be written to the disk apparatus 140 and writes the determined data to the disk apparatus 140. Further, the writing control apparatus 110 transmits to the backup apparatus 120, copy data of the data indicated in the writing request.

In the example depicted in FIG. 1, at the writing control apparatus 110, data A and data B indicated in a writing request from the host apparatus 130 are written to the cache memory 111. Further, at the backup apparatus, copy data A' of data A is written to the storage area 122 of the backup memory 121 and copy data B' of data B is written to the storage area 123 of the backup memory 121. As a result, the write pointer P2 specifies the third storage area in the backup memory 121.

Here, a case where the writing control apparatus 110 receives a writing request for data C and a case where the writing control apparatus 110 receives a writing request for data D will be described.

(1) The writing control apparatus 110 receives from the host apparatus 130, a writing request to write data C to the disk apparatus 140.

The writing control apparatus 110, upon receiving the writing request to write data C to the disk apparatus 140, refers to the writing sequence table 200 and the number of storage areas that the backup apparatus 120 has (in this example, "3"), and determines the data that is to be written to the disk apparatus 140.

For example, the writing control apparatus 110 determines the data 3-writings before, according to the writing sequence (i.e., the original data of the copy data to be over written next by the backup apparatus 120) to be data that is to be written to the disk apparatus 140 before the over writing of the copy data by the backup apparatus 120. In this example, data 3-writings before, according to the writing sequence is not present and therefore, the writing control apparatus 110 does not write any data to the disk apparatus 140.

(2) The writing control apparatus 110 writes data C to the cache memory 111, when data 3-writings before, according to the writing sequence, is not present. For example, the writing control apparatus 110 writes data C to an available storage area in the cache memory 111.

(3) The writing control apparatus 110 adds to the writing sequence table 200, a record associating the address "Add_C" where data C is written in the cache memory 111 and a writing sequence number of "3" indicating that the writing is the third writing to the cache memory 111.

(4) The writing control apparatus 110 transmits copy data C' of data C to the backup apparatus 120.

(5) The backup apparatus 120, upon receiving copy data C', writes the received copy data C' to the storage area 124 (third storage area) specified by the write pointer P2, and returns the storage area specified by the write pointer P2 to the storage area 122 (first storage area).

(6) The writing control apparatus 110 receives a writing request to write data D to the disk apparatus 140.

(7) The writing control apparatus 110, upon receiving the writing request to write data D to the disk apparatus 140, refers to the writing sequence table 200 and the number of storage areas that the backup apparatus 120 has (in this example, "3"), and determines the data that is to be written to the disk apparatus 140. In this example, the writing control apparatus 110 writes the determined data (data A, which is 3-writings before, according to the writing sequence) to the disk apparatus 140.

(8) The writing control apparatus 110, upon writing data A to the disk apparatus 140, writes data D to the cache memory 111. For example, the writing control apparatus 110 writes data D to an available storage area in the cache memory 111.

(9) The writing control apparatus 110 adds to the writing sequence table 200, a record associating the address "Add_D" where data D is written in the cache memory 111 and a writing sequence number of "4" indicating that the writing is the fourth writing to the cache memory 111.

(10) The writing control apparatus 110 transmits copy data D' of data D to the backup apparatus 120.

(11) The backup apparatus 120, upon receiving copy data D', writes the received copy data D' to the storage area 122 (first storage area) specified by the write pointer P2, and changes the storage area specified by the write pointer P2 to the storage area 123 (second storage area).

Here, at the backup apparatus 120, although copy data A' is over written by copy data D', data A (the original data of copy data A') has already been written to the disk apparatus 140 and no longer requires backup.

Thus, the writing control apparatus 110 can identify the original data of the copy data that is to be over written next by the backup apparatus 120 and can determine the data that is to be written to the disk apparatus 140. Consequently, the writing control apparatus 110 can write the original data to the disk apparatus 140 before the copy data is over written at the backup apparatus 120. At the backup apparatus 120, copy data that has become unnecessary consequent to the original data being written to the disk apparatus 140, can be over written by new copy data transmitted from the writing control apparatus 110.

Therefore, the writing control apparatus 110 need not perform processing to transmit a copy data deletion request when data backup has become unnecessary. As a result, the writing control apparatus 110 suppresses the volume of processing at the writing control apparatus 110 and suppresses the volume of communication with the backup apparatus 120.

Consequent to the backup apparatus 120 over writing copy data that no longer requires backup (the copy data being over written by new copy data), the writing control apparatus 110 can suppress the size of the storage area used for writing copy data.

Although a configuration has been described where no data is written to the disk apparatus 140 when the original data of copy data to be over written next by the backup apparatus 120 is not present, configuration is not limited hereto. For example, when the original data of copy data to be over written next by the backup apparatus 120 is not present, the original data of copy data to be over written by the backup apparatus 120 thereafter may be written to the disk apparatus 140. Further, for example, when the original data of the copy data to be over written next by the backup apparatus 120 has already been written, the original data of copy data that is to be over written thereafter by the backup apparatus 120 may be written to the disk apparatus 140.

The original data of copy data to be over written by the backup apparatus 120 may be written to the disk apparatus 140 at an arbitrary time that is favorable for the writing control apparatus 110. For example, when writing data A to the disk apparatus 140, if also writing data B is more favorable for the writing control apparatus 110, the writing control apparatus 110 writes data A and data B together and changes the writing status of data B in the writing sequence table 200 to "written".

Figure 3:
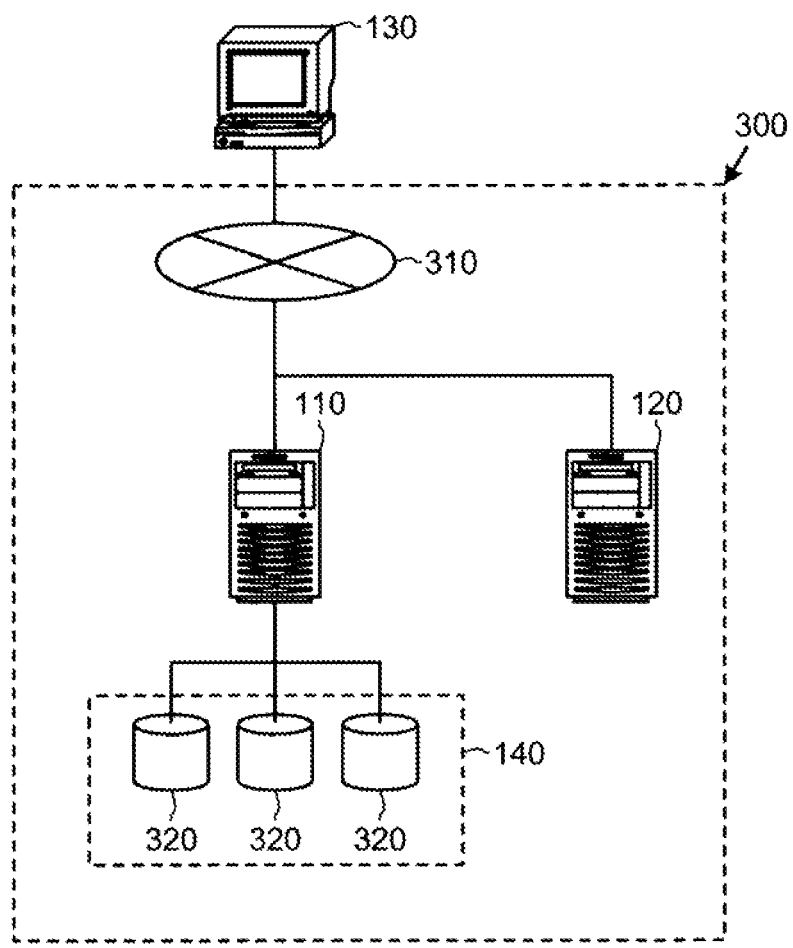
FIG. 3 is a diagram depicting an example of a system configuration of a storage system according to the embodiment.

FIG. 3 is a diagram depicting an example of a system configuration of a storage system according to the embodiment. In FIG. 3, a storage system 300 includes the writing control apparatus 110, the backup apparatus 120, the host apparatus 130, and the disk apparatus 140.

In the storage system 300, the writing control apparatus 110, the backup apparatus 120, and the host apparatus 130 are physically or wirelessly connected through a network 310, enabling communication among the apparatuses. The network 310 is, for example, the internet, a local area network (LAN), a wide area network (WAN), etc.

In the disk apparatus 140, to improve fault tolerance by data redundancy, a Redundant Arrays of Inexpensive Disks (RAID) technology of operating multiple magnetic disks 320 (3 in the figure) as a single integrated magnetic disk may be adopted.

Figure 4:
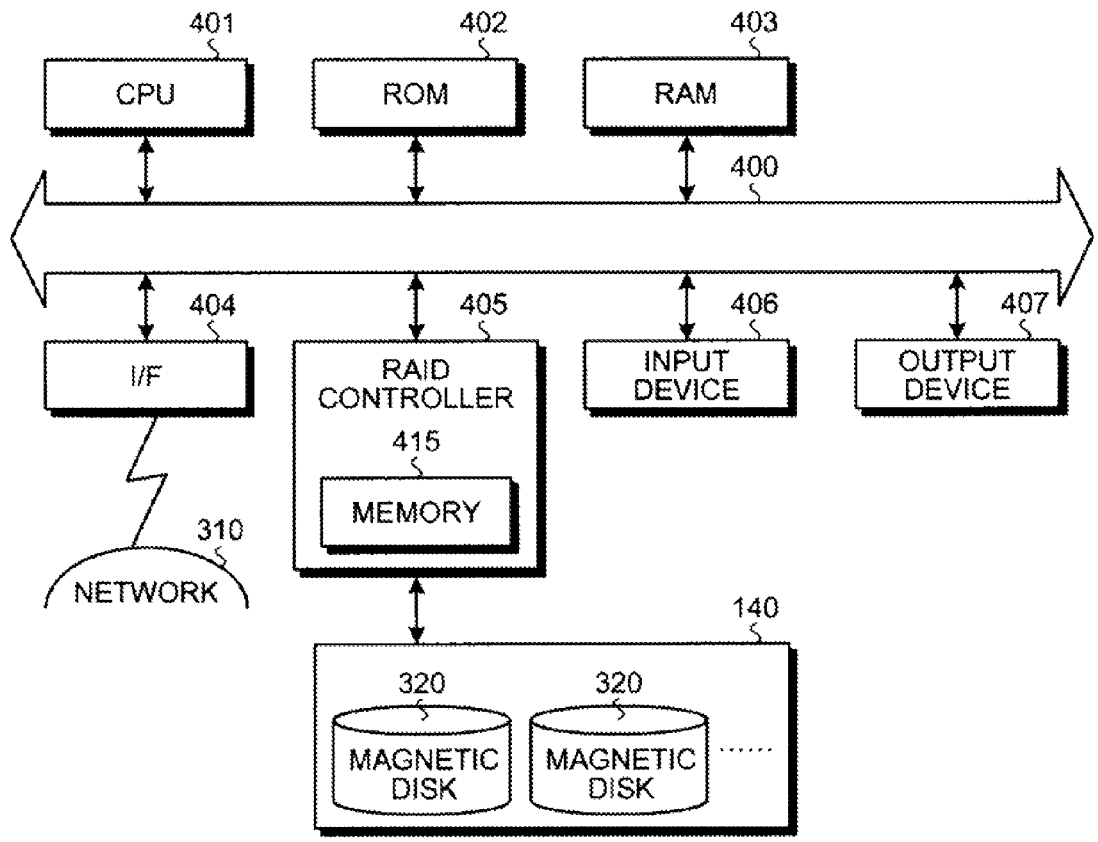
FIG. 4 is a block diagram depicting an example of a hardware configuration of a writing control apparatus 110.

FIG. 4 is a block diagram depicting an example of a hardware configuration of the writing control apparatus 110. In FIG. 4, the writing control apparatus 110 includes a central processing unit (CPU) 401, read-only memory (ROM) 402, random access memory (RAM) 403, and interface (I/F) 404, a RAID controller 405, the disk apparatus 140, an input device 406, and an output device 407, respectively connected by a bus 400.

The CPU 401 governs overall control of the writing control apparatus 110. The ROM 402 stores programs such as a boot program. The RAM 403 is used as a work area of the CPU 401. The RAM 403 may include the cache memory 111.

The I/F 404 is connected to the network 310 and through the network 310, is connected to other apparatuses. The I/F 404 administers an internal interface with the network 310 and controls the input and output of data with respect to external apparatuses. A modem, LAN adapter, etc. may be adopted for the I/F 404.

The RAID controller 405 is a controller that controls the reading and writing of data with respect to the disk apparatus 140, which includes the magnetic disks 320. The magnetic disks 320 store data written thereto under the control of the RAID controller 405. Further, the RAID controller 405 has memory 415 that stores programs executed by the RAID controller 405. The memory 415 may include the cache memory 111.

The input device 406 performs the input of data. For example, a keyboard, a mouse, a scanner, etc. may be adopted as the input device 406. The output device 407 performs the output of data. For example, a display, a printer, etc. may be used as the output device 407.

Figure 5:
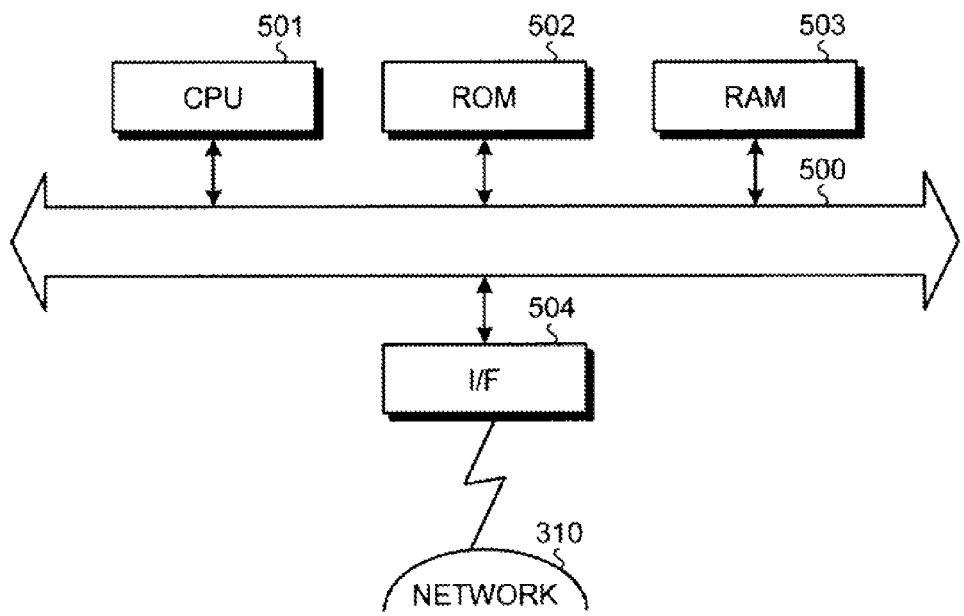
FIG. 5 is a block diagram depicting an example of a hardware configuration of a backup apparatus 120.

FIG. 5 is a block diagram depicting an example of a hardware configuration of the backup apparatus 120. In FIG. 5, the backup apparatus 120 includes a CPU 501, ROM 502, RAM 503, and an I/F 504, respectively connected by a bus 500.

The CPU 501 governs overall control of the backup apparatus 120. The ROM 502 stores programs such as a boot program. The RAM 503 is used as a work area of the CPU 501. The I/F 504 is connected to the network 310 and through the network 310, is connected to other apparatuses. The I/F 504 administers an internal interface with the network 310, and controls the input and output of data with respect to external apparatuses. A modem, LAN adapter, etc. may be adopted for the I/F 504. The RAM 503 includes the backup memory 121.

Figure 6:
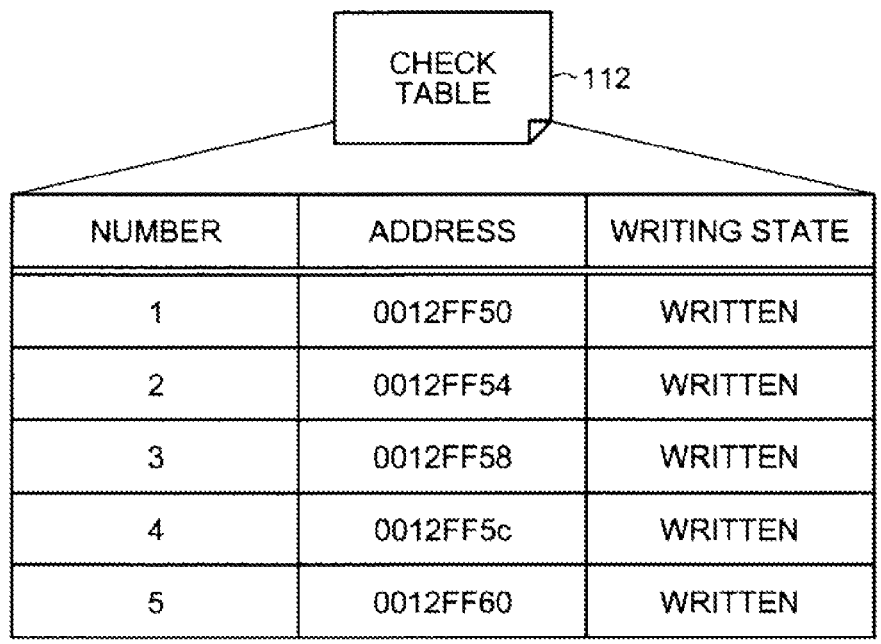
FIG. 6 is a diagram depicting one example of contents of a check table 112.

With reference to FIG. 6, the check table 112 of the writing control apparatus 110 will be described. The check table 112, for example, is implemented by the RAM 403 depicted in FIG. 4.

FIG. 6 is a diagram depicting one example of contents of the check table 112. In FIG. 6, the check table 112 includes a number field, an address field, and writing status field into which information is entered to store check information as records.

Here, the number is a number that indicates the sequence of selection by the writing control apparatus 110. The address is the address of the cache memory 111 where the data indicated in the writing request has been written. The writing status is information indicating whether the data indicated in the writing request has been written to the disk apparatus 140. The contents of the check table 112 are updated, for example, each time a writing request is received or each time the data indicated in a writing request is written to the disk apparatus 140.

Figure 7:
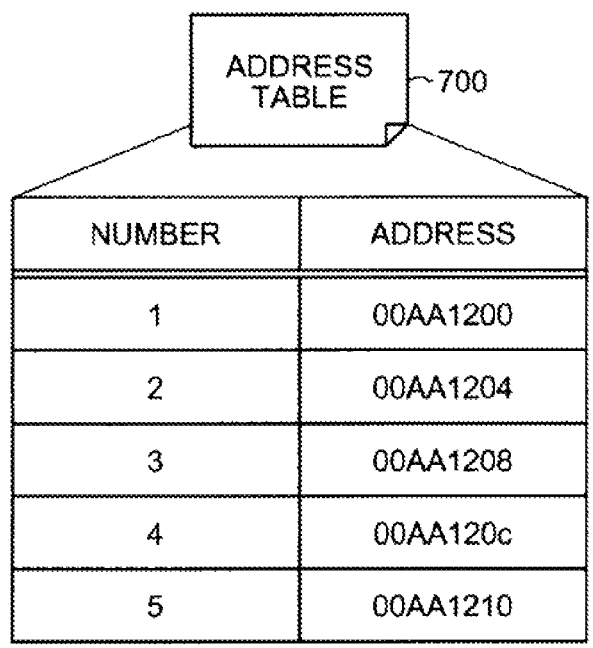
FIG. 7 is a diagram depicting one example of contents of an address table 700.

With reference to FIG. 7, one example of contents stored in an address table 700 of the backup apparatus 120 will be described. The address table 700 is, for example, implemented by the ROM 502 and the RAM 503 depicted in FIG. 5.

FIG. 7 is a diagram depicting one example of the contents of the address table 700. In FIG. 7, the address table 700 includes a number field and an address field to which information is entered to store address information as records.

Here, the number is a number indicating the sequence of selection, by the backup apparatus 120, as a storage area to which data is to be written. The address is the address of the backup memory 121 to which copy data is written, at the backup apparatus 120. The contents stored by backup memory are updated, for example, each time copy data is received from the writing control apparatus 110.

Figure 8:
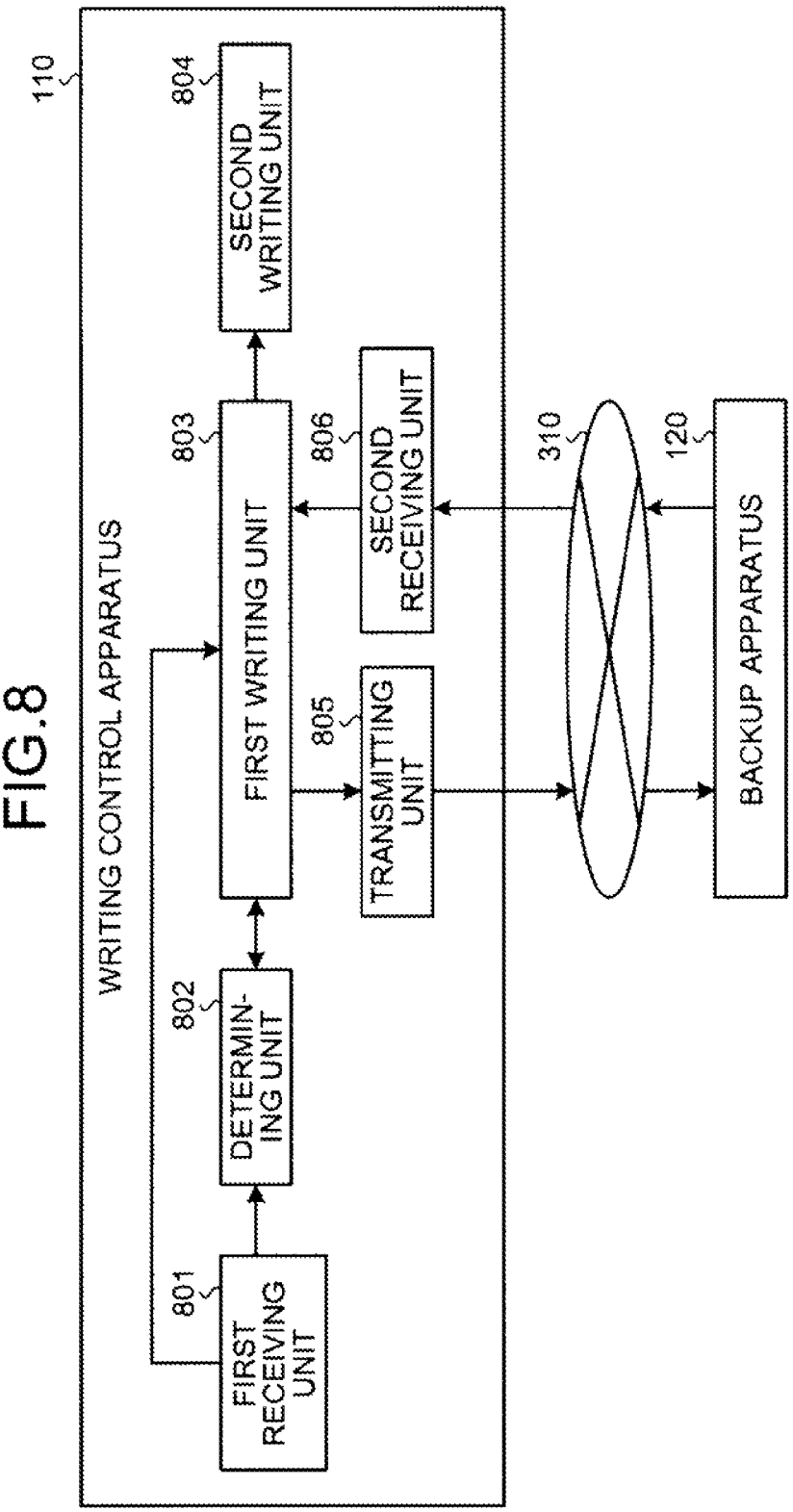
FIG. 8 is a block diagram depicting an example of a functional configuration of the writing control apparatus 110.

FIG. 8 is a block diagram depicting an example of a functional configuration of the writing control apparatus 110. The writing control apparatus 110 includes a first receiving unit 801, a determining unit 802, a first writing unit 803, a second writing unit 804, a transmitting unit 805, and a second receiving unit 806. These functions (the first receiving unit 801 to the second receiving unit 806) forming a controller, for example, are implemented by executing on the CPU 401, a program stored in a storage device such as the ROM 402 and the RAM 403 depicted in FIG. 4.

The first receiving unit 801 has a function of receiving a writing request to write a first data to the first storage apparatus. Here, the writing request includes the first data to be written to first storage apparatus. The first storage apparatus is an apparatus to which the first data indicated in the writing request is written, and for example, is the disk apparatus 140. Further, the first storage apparatus may be an optical disk, magnetic tape, etc.

For example, the first receiving unit 801 receives from the host apparatus 130, a writing request to write data to the disk apparatus 140. Further, for example, the first receiving unit 801 may receive a writing request by an input operation to the input device 406 by the user of the writing control apparatus 110.

Thus, the first receiving unit 801 can receive a trigger to commence writing to the disk apparatus 140. The received writing request, for example, is stored to a storage area of the RAM 403.

The determining unit 802 has a function of determining from among a series of data written to the computer, a second data that is to be written to the first storage apparatus. For example, based on the writing sequence of the series of data and the number of storage areas that a second storage apparatus has, the determining unit 802 determines as the second data and from among the series of data, data that is identical to data stored in the storage area that is to be selected next in the second storage apparatus.

Here, the series of data written to the computer is data written to the computer consequent to writing requests before the writing request for the first data, e.g., the series of data written to the cache memory 111 of the writing control apparatus 110. For example, the cache memory 111 may be included in the RAM 403.

The second storage apparatus is an apparatus that upon receiving copy data, sequentially selects from among multiple storage areas, a storage area to which the received copy data is to be written and stores the copy data by over writing. The second storage apparatus, for example, is the backup apparatus 120. The second storage apparatus can backup, as copy data, data indicated in a writing request, before the data indicated in the writing request is written to the disk apparatus 140.

Here, the backup apparatus 120 has the first to the M-th storage areas. The backup apparatus 120, from among the first to the M-th storage areas, sequentially selects a j-th (j=1, 2, . . . , M) storage area to which copy data is to be written. The backup apparatus 120 selects the first storage area next subsequent to the M-th storage area, whereby the first to the M-th storage areas are cyclically selected.

The backup apparatus 120 may implement the process of selecting a storage area, by for example, changing the record specified by a pointer that specifies records in the address table 700 depicted in FIG. 7.

Further, the backup apparatus 120 may implement the process of selecting a storage area by sequentially adding to the head address of the first storage area, the size of the storage areas from the first storage area to the M-th storage area. Further, the backup apparatus 120 may implement the process of selecting a storage area by associating the number j of the storage area and the array number in a pointer array that includes pointers that respectively specify the first to the M-th storage areas. The backup apparatus 120 writes the copy data to the selected j-th storage area.

For example, the determining unit 802 determines the second data to be the data first written among a group of data selected in reverse order of the writing sequence from the latest written data among the series of data. For example, the determining unit 802 refers to the number (M) of storage areas that the backup apparatus 120 has and the writing sequent of the series of data in the writing control apparatus 110. The determining unit 802 determines the data written M-writings before by the writing control apparatus 110, to be the original data of the copy data to be over written next by the backup apparatus 120 and determines the data written M-writings before to be the data to be written to the disk apparatus 140.

Thus, the determining unit 802 can determine the original data of the copy data to be over written next by the backup apparatus 120 as data that is to be written to the disk apparatus 140. Determination results, for example, are stored to a storage area such as in the RAM 403.

For example, the determining unit 802, for each reception of a writing request, determines as the second data, the data that has been written a storage area sequentially selected from among the first to the N-th storage areas in the computer. Here, the second data is the data that is to be written to the first storage apparatus.

For example, the determining unit 802 refers to the check table 112 and from among the first to the N-th storage areas included in the cache memory 111, sequentially selects an i-th (i=1, 2, . . . , N) storage area to which data that is requested to be written to the disk apparatus 140, is to be written. The writing control apparatus 110 selects the first storage area next subsequent to the N-th storage area, whereby the first to the N-th storage areas are cyclically selected.

The selected storage area, for example, can be identified by the check pointer P1, which specifies the i-th record in the check table 112. The number "i" of the record specified by the check pointer P1, for example, is incremented each time data indicated in a writing request is written to the cache memory 111. However, if the number "i" becomes "i=N+1" consequent to incrementing, the number "i" of the record specified by the check pointer P1 is returned to "i=1". The determining unit 802 determines the data written to the storage area of the address indicated in the i-th record, as data that is to be written.

Thus, the determining unit 802, together with the backup apparatus 120, cyclically performs processing, whereby assuredly, the original data can be determined as data that is to be written, before the copy data thereof is over written by the backup apparatus 120. As a result, before the copy data is over written at the backup apparatus 120, the determining unit 802 can determine the original data as data that is to be written to the disk apparatus 140. Determination results, for example, are stored to a storage area such as in the RAM 403.

The first writing unit 803 has a function of storing to the first storage apparatus, the second data determined by the determining unit 802. Here, the second data is the data that has been determined by the determining unit 802, to be written to the first storage apparatus. For example, the first writing unit 803 reads from the cache memory 111 and writes to the disk apparatus 140, the determined data. Thus, the first writing unit 803 can write the determined data to the disk apparatus 140. As a result, the first writing unit 803 can write the original data to the disk apparatus 140, before the copy data thereof is over written at the backup apparatus 120.

When the CPU 401 is the first writing unit 803, the CPU 401 may control the RAID controller 405 and write to the disk apparatus 140, the data that has been read from the cache memory 111 to be written to the disk apparatus 140. Here, the CPU 401 receives a writing completion response from the RAID controller 405 and thereby, detects that writing to the disk apparatus 140 has been completed.

The transmitting unit 805 has a function of transmitting to the second storage apparatus, copy data of the first data. Here, the first data is the data indicated in a writing request received by the first receiving unit 801.

For example, the first writing unit 803 transmits to the second storage apparatus, the copy data of data indicated in the writing request. The second storage apparatus, upon receiving the data, sequentially selects a storage area from among the first to the M-th and to which the data is to be written, and over writes the selected storage area with the received data.

For example, before the data indicated in the writing request is written to the first storage apparatus, the transmitting unit 805 transmits to the backup apparatus 120, copy data of the data indicated in a writing request.

Consequently, before the data indicated in a writing request is written to the first storage apparatus, the transmitting unit 805 can transmit data for backup at the backup apparatus 120. As a result, at the backup apparatus 120, copy data that has become unnecessary can be over written by new data transmitted from the writing control apparatus 110.

The first receiving unit 801 has a function of receiving a writing instruction to write to the first storage apparatus, a third data that is data among the series of data and not written to the first storage apparatus. Here, the third data is data indicated in a writing instruction and data that is among the series of data written to the cache memory 111 and not written to the disk apparatus 140. For example, by an input operation to the input device 406 by the user of the writing control apparatus 110, the first receiving unit 801 receives the writing instruction to write to the disk apparatus 140, data that is written in the cache memory 111 and that has not been written to the disk apparatus 140.

For example, upon detecting that the processing volume of the writing control apparatus 110 is less than or equal to a threshold, the first receiving unit 801 causes generation of a writing instruction to write to the disk apparatus 140, data that is among data written in the cache memory 111 and that has not been written to the disk apparatus 140.

The first writing unit 803 has a function of writing the third data to the first storage apparatus. Further, the first writing unit 803 has a function of changing the writing status of the third data in a table to "written", when the third data has been stored to the first storage apparatus. The table stores writing statuses indicating whether each of the data among the series of data has been written to the first storage apparatus.

Here, the table stores writing statuses indicating whether each of the data among the series of data has been written to the first storage apparatus is the check table 112. The third data is the data indicated in the writing instruction and data that is among the data written in the cache memory 111 and not written to the disk apparatus 140.

For example, the first writing unit 803 writes to the disk apparatus 140, the data indicated in the writing instruction. Further, for example, when the data indicated in the writing instruction has been written to the disk apparatus 140, the first writing unit 803 changes the status set in the check table 112 record corresponding to the written data, to information indicating writing completion. As a result, the first writing unit 803 can suppress the seek time consumed for writing to and reading from the disk apparatus 140, by writing data to successive storage areas in the disk apparatus 140.

The first writing unit 803 has a function of referring to the writing status of the second data in the table and judging whether the second data has been written to first storage apparatus. Further, the first writing unit 803 has a function of writing the second data to the first storage apparatus, upon judging that the second data has not been written to the first storage apparatus. Here, the second data is data that has been determined by the determining unit 802, to be written to the first storage apparatus.

For example, the first writing unit 803, based on the writing status indicated in the check table 112 record corresponding to the data that is to be written, judges whether the data has already been written to the disk apparatus 140. Further, for example, the first writing unit 803, upon judging that the data has not been written to the disk apparatus 140, writes the data to the disk apparatus 140.

Thus, when data that is to be written has already been written to the disk apparatus 140, the first writing unit 803 can omit processing to write the data to the disk apparatus 140. Judgment results, for example, are stored to a storage area such as in the RAM 403.

The second writing unit 804 has a function of writing the first data to the storage area in which the second data is written (in the computer), when the second data has been written to the first storage apparatus. Here, the first data is the data indicated in the writing request received by the first receiving unit 801. The second data is the data determined, by the determining unit 802, to be stored to the first storage apparatus. For example, when the data that is to be written to the disk apparatus 140 has been written to the disk apparatus 140 by the first writing unit 803, the second writing unit 804 writes the data indicated in the writing request, to the storage area (in the cache memory 111) where the data to be written to the disk apparatus 140 is written.

For example, the second writing unit 804 writes the data indicated in the writing request to the storage area to which data was written M writings before. Further, for example, the second writing unit 804 writes to the storage area indicated in the i-th record, the data indicated in the writing request. As a result, the second writing unit 804 can suppress the volume of memory used in the cache memory by overwriting data therein that has been written to the disk apparatus 140, the data being over written with the data indicated in the writing request.

The second writing unit 804 has a function of writing the first data to the storage area (in the computer) where the second data is written, when the second data has been judged to be stored to first storage apparatus. Here, the first data is the data indicated in a writing request received by the first receiving unit 801. The second data is the data that has been determined for writing to first storage apparatus by the determining unit 802.

For example, when the data that is to be written has been judged to already be written to the disk apparatus 140 by the first writing unit 803, the second writing unit 804 identifies the storage area in the cache memory 111, to which data is to be written. The second writing unit 804 writes the data indicated in the writing request to the identified storage area.

For example, the second writing unit 804 writes the data indicated in the writing request to the storage area to which data was stored M writings before. Further, for example, the second writing unit 804 writes the data indicated in the writing request to the storage area of the address indicated in the i-th record. Thus, the second writing unit 804 can suppress the volume of memory used in the cache memory by overwriting data therein that has been written to the disk apparatus 140, the data being over written with the data indicated in the writing request.

The transmitting unit 805 has a function of transmitting copy data of the first data to the second storage apparatus. Here, the first data is the data indicated in the writing request received by the first receiving unit 801.

For example, when the data that is to be written to the disk apparatus 140 by the first writing unit 803 has been judged to be written to the disk apparatus 140, the transmitting unit 805 transmits to the backup apparatus 120, copy data of the data indicated in the writing request, before the writing of the data indicated in a writing request.

Consequently, before the writing of the data indicated in the writing request, the transmitting unit 805 can transmit data for backup at the backup apparatus 120. As a result, at the backup apparatus 120, copy data that has become unnecessary can be over written by new data transmitted from the writing control apparatus 110.

The first writing unit 803 has a function of detecting failures in the reading of the first data from the computer, when the first data written in the computer is written to the first storage apparatus. Here, the first data is the data indicated in the writing request received by the first receiving unit 801.

For example, when the data written in the cache memory 111 and indicated in the writing request is written to the disk apparatus 140, the first writing unit 803 detects a failure in the reading of the data indicated in the writing request, from the cache memory 111. As a result, the first writing unit 803 can detect a trigger for transmitting to the backup apparatus 120, copy data of the data indicated in the writing request. Detection results are stored to, for example, a storage area such as in the RAM 403.

The transmitting unit 805 has a function of transmitting a transmission request for copy data to the second storage apparatus, when the first data written in the computer is written to the first storage apparatus and a failure occurs in the reading of the first data from the computer. Here, the first data is the data indicated in the writing request received by the first receiving unit 801. The transmission request, for example, includes information indicating that the request copy data is the copy data transmitted X transmissions before. Here, the backup apparatus 120 transmits to the writing control apparatus 110, the copy data transmitted X transmissions before.

For example, when a failure in the reading of the data indicated in the writing request is detected by the first writing unit 803, the transmitting unit 805 transmits to the backup apparatus 120, a transmission request for copy data of the data indicated in the writing request. As a result, the transmitting unit 805 can cause copy data to be transmitted to the backup apparatus 120.

The second receiving unit 806 has a function of receiving copy data from the second storage apparatus consequent to the transmitted request for the copy data. For example, consequent to the transmission of the request for the copy data by the transmitting unit 805, the second receiving unit 806 receives the copy data from the backup apparatus 120. Thus, the second receiving unit 806 can receive, in place of the data indicated in the writing request, copy data to be written to the disk apparatus 140. The received copy data is, for example, stored to a storage area such as in the RAM 403.

The first writing unit 803 has a function of writing the received copy data to the first storage apparatus. For example, in place of the data indicated in the writing request, the first writing unit 803 writes to the disk apparatus 140, the copy data received by the second receiving unit 806. As a result, even when data is lost consequent to trouble at the cache memory 111, the first writing unit 803 can write to the disk apparatus 140, copy data of the same contents as the data indicated in the writing request.

With reference to FIGS. 9 to 14, writing control processing performed by the writing control apparatus 110 to write data to the disk apparatus 140 will be described. The description of processes identical to those described with reference to FIG. 1 will be omitted.

FIGS. 9 to 14 are diagrams depicting the contents of the writing control processing performed by the writing control apparatus 110 to write data to the disk apparatus 140. In FIG. 9, the writing control apparatus 110 has the first to the N-th (N is a natural number of 1 or greater) storage areas; and the backup apparatus 120 has the first to M-th (M=N) storage area to which copy data is written.

Hereinafter, cases when the writing control apparatus 110 receives a writing request for data A, a writing request for data B, a writing request for data C, and a writing request for data D will be described.

Figure 10:
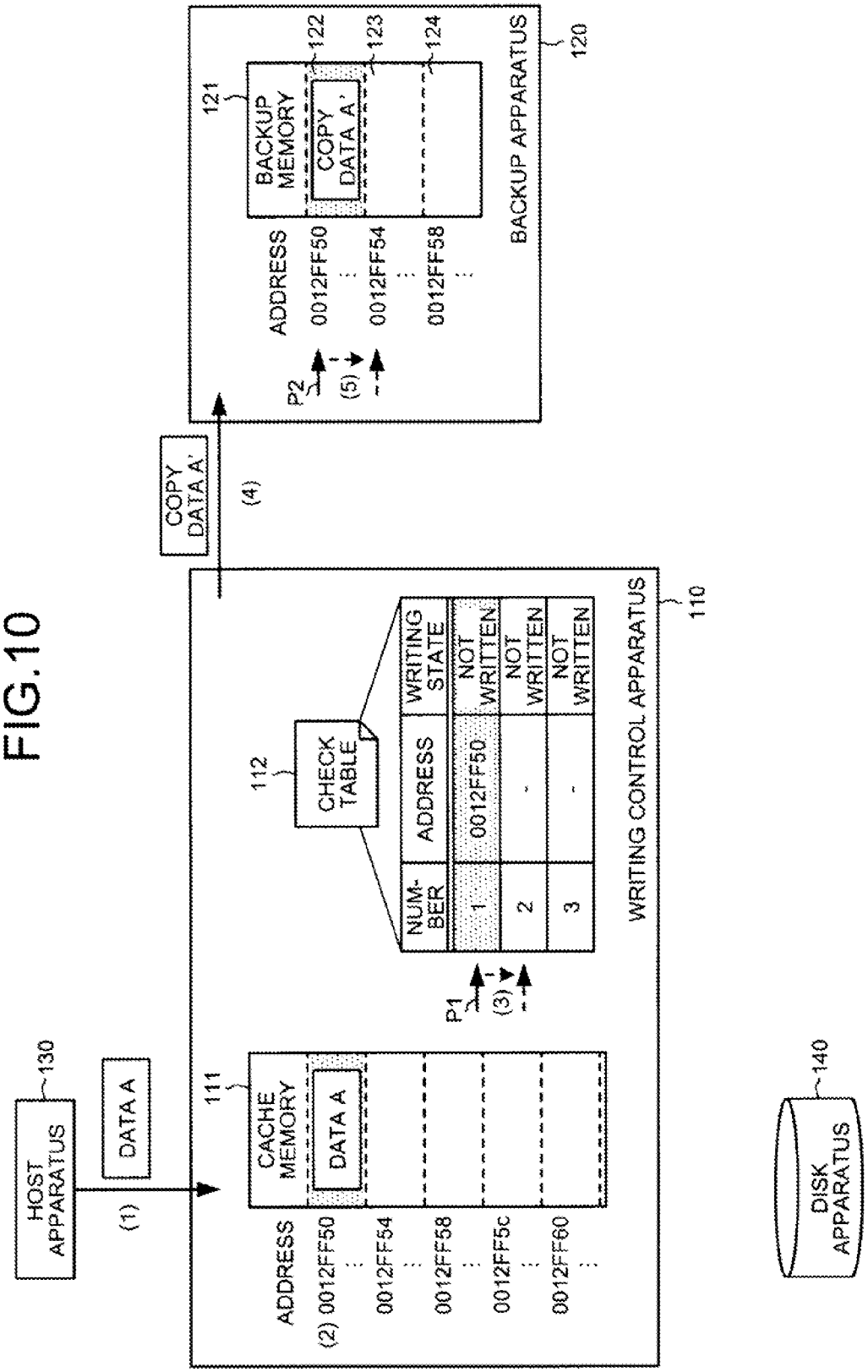

In FIG. 10, (1) the writing control apparatus 110 receives from the host apparatus 130, a writing request to write data A to the disk apparatus 140.

(2) The writing control apparatus 110, upon receiving the writing request for data A, writes data A to the cache memory 111.

(3) The writing control apparatus 110, upon writing data A to the cache memory 111, changes the address indicated in the first record specified by the check pointer P1, to the address "0012FF50", where data A has been written. Further, the writing control apparatus 110 changes the writing status indicated in the first record specified by the check pointer P1, to information "not written" indicating that data A has not been written to the disk apparatus 140. The writing control apparatus 110 changes the record specified by the check pointer P1, to the second record.

(4) The writing control apparatus 110 transmits copy data A' of data A to the backup apparatus 120.

(5) The backup apparatus 120, upon receiving copy data A', writes copy data A' to the storage area 122 (the first storage area) specified by the write pointer P2, and changes the storage area specified by the write pointer P2 to the storage area 123 (the second storage area).

Figure 11:
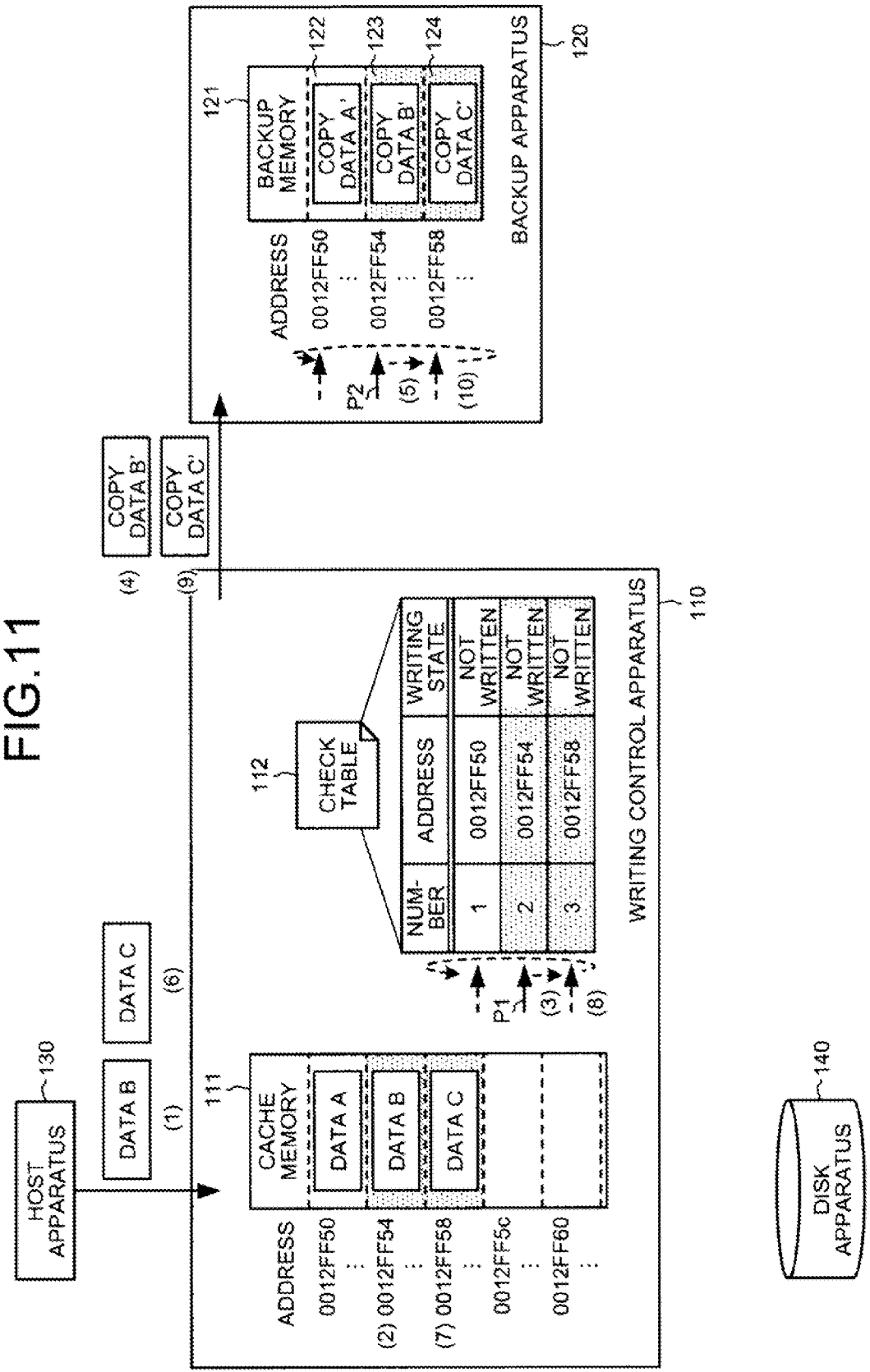

In FIG. 11, (1) the writing control apparatus 110 receives from the host apparatus 130, a writing request to write data B to the disk apparatus 140.

(2) The writing control apparatus 110, upon receiving the writing request for data B, writes data B to the cache memory 111.

(3) The writing control apparatus 110, upon writing data B to the cache memory 111, changes the address indicated in the second record specified by the check pointer P1, to the address "0012FF54" where data B has been written. Further, the writing control apparatus 110 changes the writing status indicated in the second record specified by the check pointer P1 to information "not written" indicating that data B has not been written to the disk apparatus 140. The writing control apparatus 110 changes the record specified by the check pointer P1, to the third record.

(4) The writing control apparatus 110 transmits to the backup apparatus 120, copy data B' of data B.

(5) The backup apparatus 120 writes the received copy data B' to the storage area 123 (the second storage area) specified by the write pointer P2 and changes the storage area specified by the write pointer P2, to the third storage area.

(6) The writing control apparatus 110 receives from the host apparatus 130, a writing request to write data C to the disk apparatus 140.

(7) The writing control apparatus 110, upon receiving the writing request for data C, writes data C to the cache memory 111.

(8) The writing control apparatus 110, upon writing data C to the cache memory 111, changes the address indicated in the third record specified by the check pointer P1, to the address "0012FF58", where data C has been written. Further, the writing control apparatus 110 changes the writing status indicated in the third record specified by the check pointer P1, to information "not written" indicating that data C has not been written to the disk apparatus 140. The writing control apparatus 110 returns the record specified by the check pointer P1, to the first record.

(9) The writing control apparatus 110 transmits copy data C' of data C to the backup apparatus 120.

(10) The backup apparatus 120, upon receiving copy data C', writes copy data C' to the storage area 124 (the third storage area) specified by the write pointer P2, and returns the storage area specified by the write pointer P2, to the storage area 122 (the first storage area).

Figure 12:
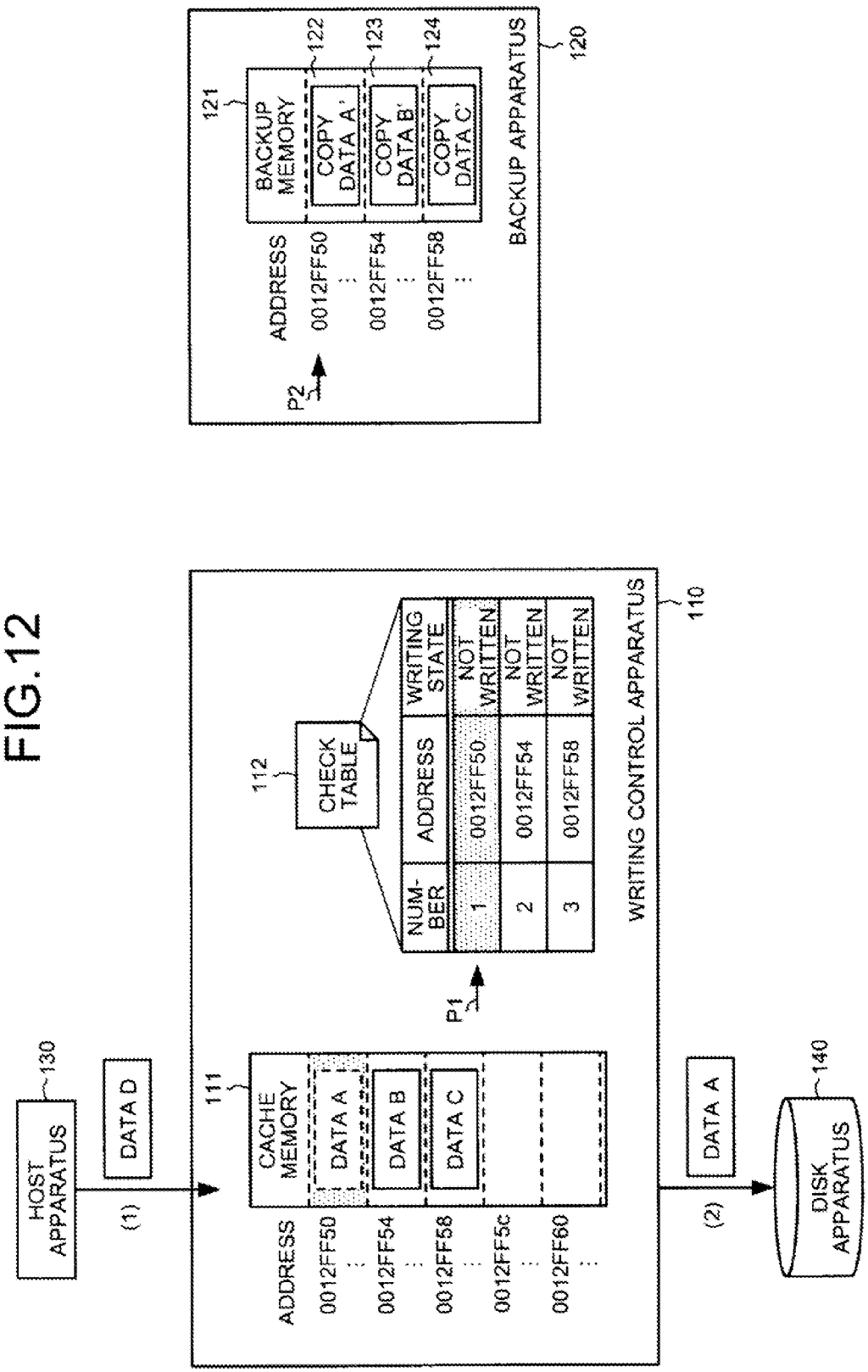

In FIG. 12, (1) the writing control apparatus 110 receives a writing request to write data D to the disk apparatus 140.

(2) The writing control apparatus 110, upon receiving the writing request for data D, refers to the writing status indicated in the first record specified by the check pointer P1, and since the writing status is not "written", the writing control apparatus 110 reads data A that has been written to the storage area of the address "0012FF50" as indicated in the first record. The writing control apparatus 110 writes data A to the disk apparatus 140.

Here, when the writing status is "completed", the writing control apparatus 110 does not read data from the storage area of the address "0012FF50" indicated in the first record. As a result, the writing control apparatus 110 can omit processing for writing data of the same contents to the disk apparatus 140 and the processing volume at the writing control apparatus 110 can be suppressed, while the presence of data of the same contents in the disk apparatus 140 can be prevented.

Figure 13:
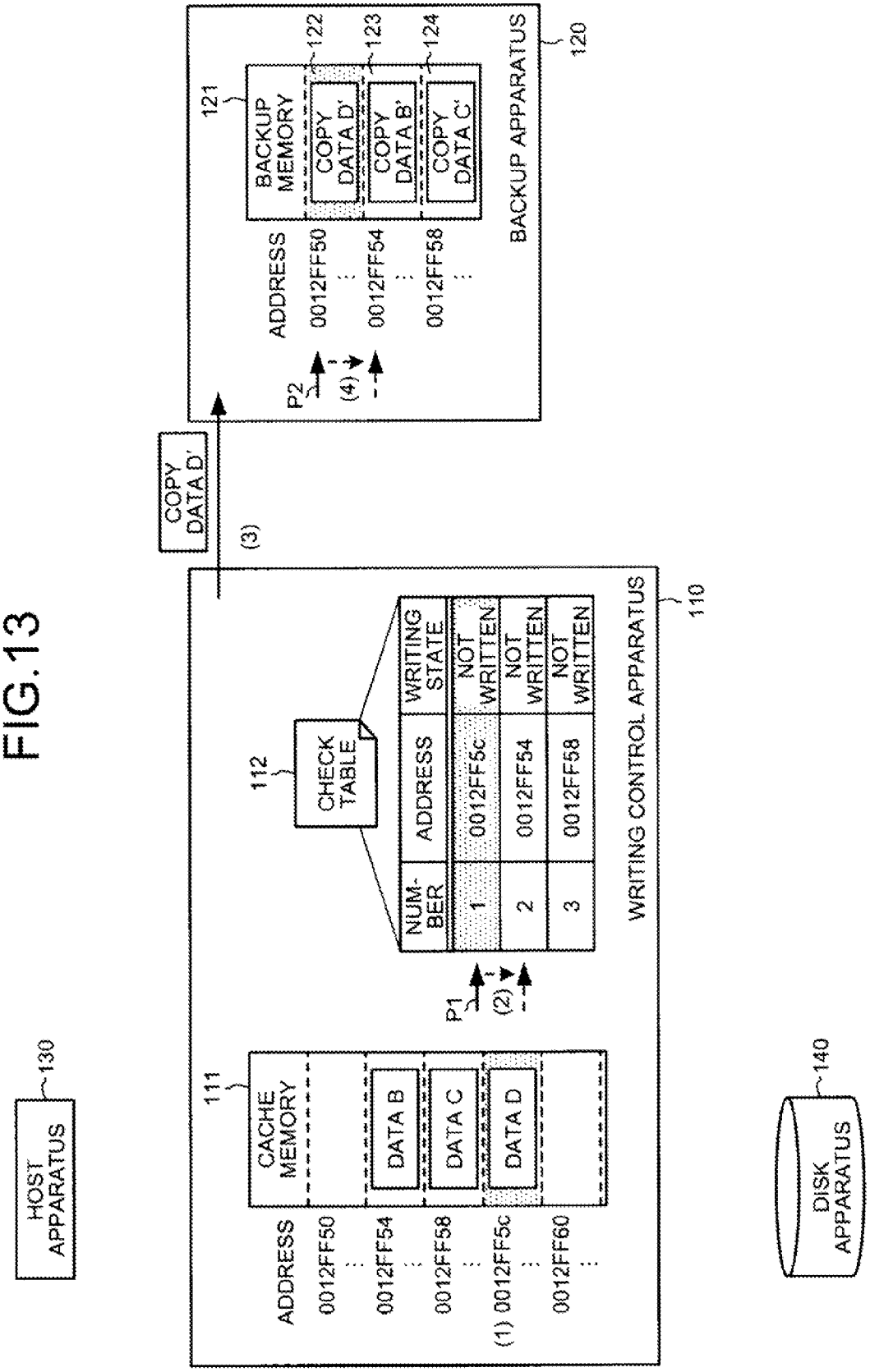

In FIG. 13, (1) the writing control apparatus 110, upon writing data A to the disk apparatus 140, writes data D to the cache memory 111. For example, the writing control apparatus 110 writes data D to an available area in the cache memory 111.

(2) The writing control apparatus 110, upon writing data D to the cache memory 111, changes the address "0012FF50"

indicated in the first record specified by the check pointer P1, to the address "0012FF5c" where data D has been written. Further, the writing control apparatus 110 changes the writing status indicated in the first record specified by the check pointer P1, to information "not written" indicating that data D has not been written to the disk apparatus 140. The writing control apparatus 110 changes the record specified by the check pointer P1, to the second record.

(3) The writing control apparatus 110 transmits copy data D' of data D to the backup apparatus 120.

(4) The backup apparatus 120, upon receiving copy data D', writes copy data D' to the storage area 122 (the first storage area) specified by the write pointer P2, and changes the storage area specified by the write pointer P2, to the storage area 123 (the second storage area).

Here, at the backup apparatus 120, although copy data A' is over written by copy data D', data A, which is the original data of copy data A' has already been written to the disk apparatus 140 and no longer requires backup.

Thus, from the M storage areas, the backup apparatus 120 sequentially and cyclically selects the storage area to which copy data is to be written, and by writing copy data to the selected storage area, the copy data written thereto 1 cycle before is over written by new copy data. Further, from among the N (N≤M) storage areas, the writing control apparatus 110 sequentially and cyclically selects the storage area from which data is to be read, and writes the read data to the disk apparatus 140.

Thus, the original data can be written to the disk apparatus 140 by the writing control apparatus 110, before the copy data is over written by the backup apparatus 120. At the backup apparatus 120, copy data whose original data has already been written to the disk apparatus 140 and thus is no longer necessary, is over written by new copy data transmitted from the writing control apparatus 110.

Consequently, the writing control apparatus 110 need not perform processing to transmit a copy data deletion request to the backup apparatus 120 when data backup has become unnecessary. As a result, the writing control apparatus 110 can suppress the volume of processing at the writing control apparatus 110 and the volume of communication with the backup apparatus 120.

Figure 14:
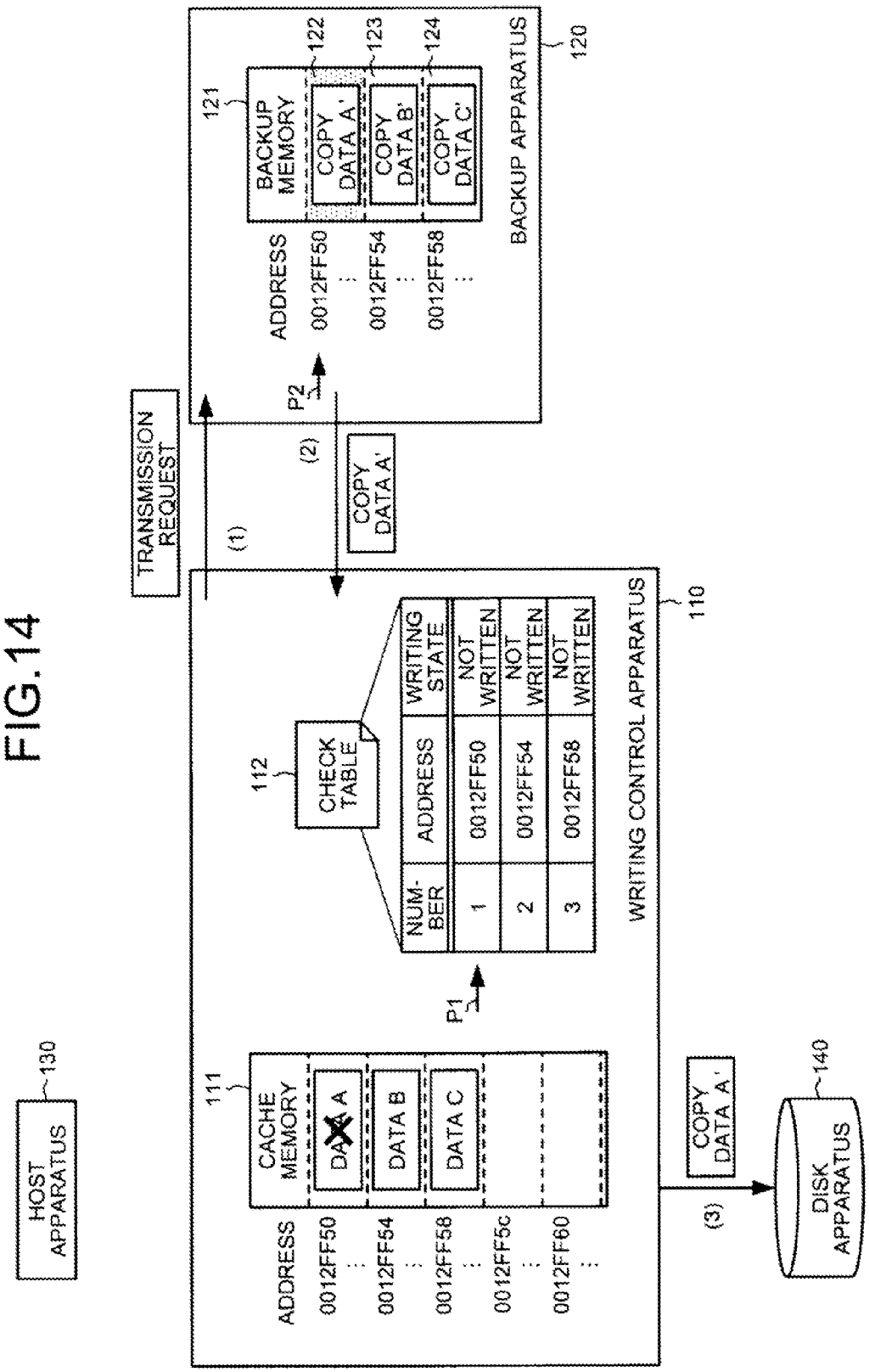

With reference to FIG. 14, the writing control processing at (2) depicted in FIG. 12 and for a case when failure occurs in the reading of data A, which is written at the storage area of the address "0012FF50" indicated in the record specified by the check pointer P1, will be described.

(1) The writing control apparatus 110, upon detecting a failure in the reading of data A, transmits to the backup apparatus 120, a transmission request to transmit copy data A' of data A indicated in record specified by the check pointer P1.

(2) The backup apparatus 120 transmits to the writing control apparatus 110, copy data A' that is to be written to the storage area 122 specified by the write pointer P2.

(3) The writing control apparatus 110, upon receiving copy data A', writes copy data A' to the disk apparatus 140, in place of data A. As a result, even when data A is lost consequent to trouble at the cache memory 111, the writing control apparatus 110 can write to the disk apparatus 140, copy data A', which is of the same contents as data A.

The transmission request includes, for example, information indicating that the requested copy data is the copy data transmitted X transmissions before. The backup apparatus 120 transmits to the writing control apparatus 110, the copy data that was transmitted X transmissions before. For example, the backup apparatus 120 uses the j-th storage area specified by the write pointer P2 as a start point and identifies the j-X storage area, which is the storage area to which copy data was written X transmissions before. The backup apparatus 120 transmits to the writing control apparatus 110, the copy data stored at the j-X storage area.

Figure 15:
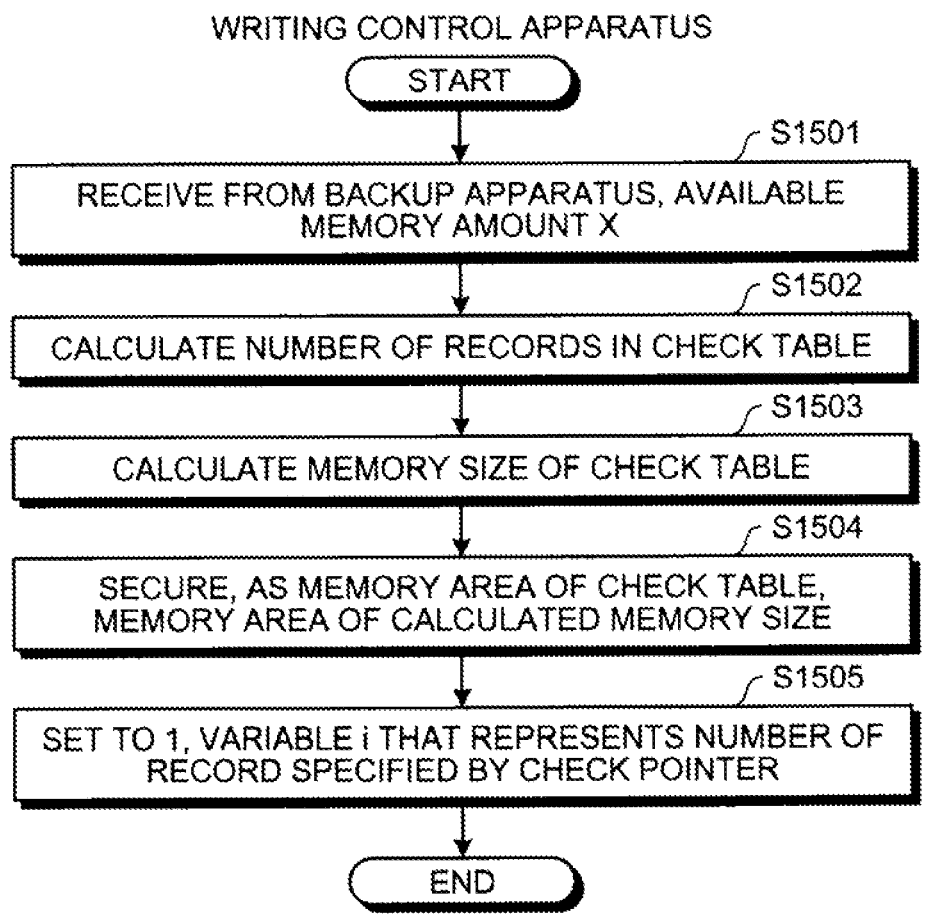
FIG. 15 is a flowchart depicting one example of a check table generation process by the writing control apparatus 110 according to the embodiment.

With reference to FIG. 15, a check table generation process by the writing control apparatus 110 will be described.

FIG. 15 is a flowchart depicting one example of the check table generation process by the writing control apparatus 110 according to the embodiment. As depicted in FIG. 15, the second receiving unit 806, receives from the backup apparatus 120, the memory amount X that is available for writing copy data to at the backup apparatus 120 (step S1501).

The first writing unit 803 divides the received memory amount X by a fixed length set for the data to be written to the disk apparatus 140 and calculates the number of records in the check table 112 (step S1502).

The first writing unit 803 multiples the calculated record count by the memory amount for 1 record in the check table 112 and calculates the memory size of the check table 112 (step S1503). The first writing unit 803 secures, as the memory area of the check table 112, a memory area of the calculated memory size (step S1504).

The determining unit 802 sets to 1, a variable i that represents the number of the record specified by the check pointer P1 (step S1505), and ends the check table generation process. Thus, the writing control apparatus 110 can generate the check table 112 having a record count that is less than or equal to the storage areas at the backup apparatus 120.

Writing control processing by the writing control apparatus 110 will be described. First, with reference to FIGS. 16 and 17, a first writing control process of the writing control processing, executed when a writing request is received will be described.

FIGS. 16 and 17 are flowcharts depicting one example of the first writing control process of the writing control apparatus 110 according to the embodiment. In FIG. 16, the first receiving unit 801 judges whether a writing request has been received from the host apparatus 130 (step S1601). If a writing request has not been received (step S1601: NO), the first receiving unit 801 returns to step S1601 and awaits the receipt of a writing request.

On the other hand, if a writing request has been received (step S1601: YES), the determining unit 802 determines whether the variable i indicative of the number of the record specified by the check pointer P1 is greater than the record count N of the check table 112 (step S1602). If the variable i is less than or equal to N (step S1602: NO), the flow returns to step S1604. On the other hand, if the variable i is greater than N (step S1602: YES), the determining unit 802 sets the variable i, which indicates the number of the record specified by the check pointer P1, to 1 (step S1603).

The determining unit 802 sets the i-th record as the record specified by the check pointer P1 (step S1604). The first writing unit 803 judges whether the writing status indicated in the i-th record specified by the check pointer P1 is "written" indicating that writing has been completed (step S1605). If the writing status is not "written" (step S1605: NO), the flow transitions to step S1701 depicted in FIG. 17.

On the other hand, if the writing status is "written" (step S1605: YES), the second writing unit 804 writes to the storage area of the address indicated in the i-th record specified by the check pointer P1, the data indicated in the writing request (step S1606).

The transmitting unit 805 transmits to the backup apparatus 120, copy data of the data indicated in the writing request (step S1607).

The first writing unit 803 enters into the i-th record specified by the check pointer P1, the address where the data indicated in the writing request has been written and information indicating that the data indicated in the writing request has not been written to the disk apparatus 140 (step S1608).

The determining unit 802 increments the variable (step S1609). The transmitting unit 805 transmits to the host apparatus 130, a writing completion response (step S1610), ending the writing process for the data indicated in the writing request.

In FIG. 17, the first writing unit 803 reads the data written at the storage area of the address indicated in the i-th record and writes the data to the disk apparatus 140 (step S1701). The first writing unit 803 judges whether the data was successfully read at step S1701 (step S1702). If the data was successfully read (step S1702: YES), the flow transitions to step S1606 depicted in FIG. 16.

If the data was not successfully read (step S1702: NO), the transmitting unit 805 transmits to the backup apparatus 120, a transmission request to transmit copy data of the data that could not be read (step S1703).

The second receiving unit 806 judges whether the copy data has been received (step S1704). If the copy data has not been received (step S1704: NO), the flow returns to step S1704 and the second receiving unit 806 awaits the reception of the copy data.

On the other hand, if the copy data has been received (step S1704: YES), the first writing unit 803 writes the copy data to the disk apparatus 140 (step S1705), and the flow transitions to step S1606 depicted in FIG. 16. Thus, the writing control apparatus 110 can write data to the disk apparatus 140, write the data indicated in the writing request to the cache memory 111, and transmit to the backup apparatus 120, copy data of the data indicated in the writing request.

With reference to FIGS. 18 and 19, a second writing control process of the writing control processing, executed when a writing instruction is received will be described.

FIGS. 18 and 19 are flowcharts depicting one example of the second writing control process of the writing control apparatus 110 according to the embodiment. The flowcharts depict a writing process executed by the writing control apparatus 110 to write data indicated in a writing instruction. In FIG. 18, the first receiving unit 801 judges whether a writing instruction has been received (step S1801). If a writing instruction has not been received (step S1801: NO), the first receiving unit 801 returns to step S1801, and awaits the receipt of a writing instruction.

On the other hand, if a writing instruction has been received (step S1801: YES), the determining unit 802 sets to 1, a variable k indicative of the number of the record in the check table 112 (step S1802). The determining unit 802 determines whether the variable k is greater than the record count N of the check table 112 (step S1803). If the variable k is greater than N (step S1803: YES), the writing process for the data indicated in the writing instruction is ended.

On the other hand, if the variable k is less than or equal to N (step S1803: NO), the determining unit 802 selects the k-th record of the check table 112 (step S1804). The first writing unit 803 judges whether the writing status indicated in the k-th record is "written" indicating completion of writing (step S1805). If the writing status is not "written" (step S1805: NO), the flow transitions to step S1901 depicted in FIG. 19.

On the other hand, if the writing status is "written" (step S1805: YES), the determining unit 802 increments the variable k (step S1806), and returns to step S1803.

In FIG. 19, the first writing unit 803 reads the data written in the storage area of the address indicated in the k-th record and writes the data to the disk apparatus 140 (step S1901).

The processes at steps S1902 to S1905 are transitioned to and since the processes at steps S1902 to S1905 are identical to the processes at steps S1702 to S1705, description thereof is omitted.

The first writing unit 803 sets the writing status in the k-th record to "written" indicating that writing has been completed (step S1906), and transitions to step S1806 depicted in FIG. 18. Thus, when a writing instruction has been received, the writing control apparatus 110 can write to the disk apparatus 140, data that has not yet been written to the disk apparatus 140.

With reference to FIG. 20, a startup process by the backup apparatus 120 will be described.

FIG. 20 is a flowchart depicting one example of the startup process by the backup apparatus 120 according to the embodiment. The CPU 501, concerning the backup memory 121, checks for hardware failure (step S2001).

The CPU 501 judges whether there is failure (step S2002). If there is no failure (step S2002: NO), the CPU 501 transmits to the writing control apparatus 110, the memory amount X available for writing copy data at the backup apparatus 120 (step S2003), and ends the startup process.

On the other hand, if there is failure (step S2002: NO), the CPU 501 outputs an error message (step S2004), and ends the startup process. Thus, the backup apparatus 120 can transmit to the writing control apparatus 110, information indicating the number of storage areas at the backup apparatus 120 and can transition to a state enabling the writing of copy data to the storage areas.

With reference to FIG. 21, a copy data writing process by the backup apparatus 120 will be described.

FIG. 21 is a flowchart depicting one example of the copy data writing process by the backup apparatus 120. In FIG. 21, the CPU 501 judges whether copy data has been received (step S2101). If copy data has not been received (step S2101: NO), the flow returns to step S2101 and the CPU 501 awaits reception of copy data.

On the other hand, if copy data has been received (step S2101: YES), the CPU 501 judges whether the variable j indicative of the number of the storage area specified by the write pointer P2 is greater than the number of storage areas M that the backup memory 121 has (step S2102). If the variable j is less than or equal to M (step S2102: NO), the flow transitions to step S2104.

On the other hand, if the variable j is greater than M (step S2102: YES), the CPU 501 sets to 1, the variable j, which indicates the number of the storage area specified by the write pointer P2 (step S2103). The CPU 501 selects the j-th storage area (step S2104) and writes the copy data to the j-th storage area (step S2105).

The CPU 501 increments the variable j (step S2106), and ends the copy data writing process. Thus, the backup apparatus 120 can write copy data to the backup memory 121.

With reference to FIG. 22, a copy data transmission process by the backup apparatus 120 will be described.

FIG. 22 is a flowchart depicting one example of the copy data transmission process by the backup apparatus 120 according to the embodiment. In FIG. 22, the CPU 501 judges whether a transmission request for copy data has been received (step S2201). If a transmission request for copy data has not been received (step S2201: NO), the flow returns to step S2201 and the CPU 501 awaits the reception of a transmission request.

If a transmission request for copy data has been received (step S2201: YES), the CPU 501 reads the copy data from the backup memory 121 (step S2202). The CPU 501 transmits the read copy data to the writing control apparatus 110 (step S2203), and ends the copy data transmission process.

Thus, the backup apparatus 120 can transmit the requested copy data to the writing control apparatus 110.

As described, the writing control apparatus 110 according to the embodiment enables a j-th storage area to which data is to be stored, to be sequentially selected from among the first to the M-th storage areas in the backup memory 121; and communication with the backup apparatus 120, which writes copy data. The writing control apparatus 110 further enables the copy data is to be over written next by the backup apparatus 120 to be identified based on the writing sequence of the series of data written to the cache memory 111 and the number of storage areas M that the backup apparatus 120 has.

The writing control apparatus 110 enables the original data that is to be written to the disk apparatus 140 to be determined and written to the disk apparatus 140, before the copy data is overwritten by the backup apparatus. The writing control apparatus 110 further enables over writing of copy data that has become unnecessary at the backup apparatus 120, with newly transmitted copy data, by a transmission of new copy data to the backup apparatus 120.

Thus, without transmitting a deletion request to delete copy data that does not need backup or an instruction indicating the storage area to which copy data is to be written in the backup memory 121, the writing control apparatus 110 can cause the copy data that has become unnecessary in the backup apparatus to be over written. As a result, the writing control apparatus 110 can suppress the processing volume at the writing control apparatus 110.

Compared to a case where a deletion request for copy data that no longer requires backup is transmitted, the writing control apparatus 110 can suppress the volume of communication with the backup apparatus 120. Further, the writing control apparatus 110 enables copy data to be stored at the backup apparatus 120 without being over written, until the corresponding data in the cache memory 111 has been written to the disk apparatus 140.

As a result, without receiving a copy data deletion request or an instruction indicating the storage area to which copy data is to be written in the backup memory 121, the backup apparatus 120 can write copy data to an available storage area in the backup memory 121, independent of the writing control apparatus 110. Therefore, the backup apparatus 120 can suppress the amount of memory used in the backup memory 121. The backup apparatus 120 automatically over writes copy data that no longer requires backup, with copy data that has been newly received by the backup apparatus 120, whereby the amount of memory used in the backup memory 121 can be suppressed.

The writing control apparatus 110 enables determination of the data written to the cache memory 111 M writings before (based on the data writing sequence and the number of storage areas M), to be the original data of the copy data that is to be over written next by the backup apparatus 120.

The writing control apparatus 110 enables data indicated in a writing instruction to be written to the disk apparatus 140, by the receipt of a writing instruction for the data, which is in the cache memory 111. The writing control apparatus 110 further enables the writing status of the data to be managed by the check table 112, which stores information indicating whether data in the cache memory 111 has been written to the disk apparatus 140.

The writing control apparatus 110 enables data that has not been written to the disk apparatus 140 to be identified by referring to the writing status indicated in the check table 112, when a writing instruction for data that has not been written to the disk apparatus 140 has been received. The writing control apparatus 110 enables the identified data to be written to the disk apparatus 140.

Thus, the writing control apparatus 110 can identify the data that has not been written to the disk apparatus 140 and collectively write the data to successive storage areas in the disk apparatus 140 and thereby, suppress the seek time consumed for writing to the disk apparatus 140. The writing control apparatus 110 can suppress the seek time consumed for reading from the disk apparatus 140 by writing data to successive storage areas in the disk apparatus 140.

The writing control apparatus 110 enables reference of the check table 112 and judgment of whether data that has been determined to be written to the disk apparatus 140 has already been written thereto. The writing control apparatus 110 further enables a configuration such that the determined data is written to the disk apparatus 140 only when the determined data has not already been written to the disk apparatus 140. Thus, the writing control apparatus 110 can omit processing for writing data of the same contents to the disk apparatus 140 and can prevent data of the same contents from being present in the disk apparatus 140.

According to the writing control apparatus 110, when the data determined to be written to the disk apparatus 140 has been judged to already been written thereto, the data indicated in a writing request is over written to a storage area in which the data written the disk apparatus 140 is written. Thus, the writing control apparatus 110 can suppress the amount of memory used in the cache memory 111 by over writing data that is the cache memory 111 and has been written to the disk apparatus 140, with data that has not been written to the disk apparatus 140.

The writing control apparatus 110, when data that is to be written to the disk apparatus 140 cannot be read consequent to a failure at the cache memory 111, transmits a transmission request for copy data of the data to the backup apparatus 120. Further, the writing control apparatus 110 stores the copy data received from the backup apparatus 120 to the disk apparatus 140, in place of the data that could not be read. Thus, even when data is lost consequent to a failure at the cache memory 111, the writing control apparatus 110 can write to the disk apparatus 140, copy data that is of the same contents as the data.

Further, the writing control apparatus 110 receives a writing request to write to data the disk apparatus 140 from the host apparatus 130. The writing control apparatus 110, upon receiving the writing request, writes the data indicated in the writing request to the cache memory 111 and transmits a writing completion response to the host apparatus 130, before writing the data to the disk apparatus 140. Thus, the writing control apparatus 110 can improve the response performance with respect to the host apparatus 130.

The writing control method described in the embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a writing control process comprising:
   receiving a writing request to write a first data to a first storage apparatus;
   determining a second data from among a series of data and based on (1) a writing sequence of the series of data written to the computer before the writing request is received and (2) a count of storage areas at a second storage apparatus that sequentially selects, from among the storage areas when data is received, a storage area to be overwritten by the received data, wherein the second data is to be written to the first storage apparatus and is identical to data that is stored in the storage area to be selected next at the second storage apparatus; and
   transmitting copy data of the first data to the second storage apparatus, when the determined second data has been written to the first storage apparatus.

2. The non-transitory, computer-readable recording medium according to claim 1, wherein the determining includes determining the second data to be the data first written among a group of data selected in reverse order of the writing sequence from the latest written data among the series of data.

3. The non-transitory, computer-readable recording medium according to claim 1, the process further comprising:
   receiving a writing instruction to write to the first storage apparatus, a third data that is among the series of data and has not been written to the first storage apparatus; and
   changing, in a table storing a writing status for each data among the series of data and indicating whether the data has been written to the first storage apparatus, the writing status for the third data to indicate that writing has been completed, when the third data has been written to the first storage apparatus.

4. The non-transitory, computer-readable recording medium according to claim 3, the process further comprising:
   referring to the writing status of the second data in the table and judging whether the second data has been written to the first storage apparatus;
   writing the second data to the first storage apparatus, when the second data is judged to not have been written to first storage apparatus; and
   writing the first data to the storage area where the second data is written in the computer, when the second data has been written to the first storage apparatus.

5. The non-transitory, computer-readable recording medium according to claim 4, wherein
   the writing of the first data to the computer includes writing the first data to the storage area where the second data is written in the computer, when the second data has been judged to be written to the first storage apparatus, and
   the transmitting includes transmitting the copy data of the first data to the second storage apparatus, when the second data has been judged to be written to the first storage apparatus.

6. The non-transitory, computer-readable recording medium according to claim 1, the process further comprising:
   transmitting a transmission request for copy data to the second storage apparatus, when the first data written in the computer is written to the first storage apparatus and reading of the first data from the computer fails;
   receiving the copy data from the second storage apparatus consequent to the transmitting of the transmission request for copy data; and
   writing the received copy data to the first storage apparatus.

7. The non-transitory, computer-readable recording medium according to claim 1, wherein
   the determining includes determining for each reception of a writing request, the second data to be the data written in the storage area sequentially selected from among a first storage area to an N-th storage area, where N is a natural number of 1 or greater, and
   the transmitting includes transmitting the copy data of the first data, when the second data has been written to the first storage apparatus, where the copy data of the first data is transmitted to the second storage apparatus that sequentially selects, from among a first storage area to an M-th storage area when data is received, a storage area to be overwritten by the received data, and where M is a natural number greater than or equal to N.

8. The non-transitory, computer-readable recording medium according to claim 1, wherein the first storage apparatus is a disk apparatus.

9. A writing control method executed by a computer, the writing control method comprising:
   receiving a writing request to write a first data to a first storage apparatus;
   determining a second data from among a series of data and based on (1) a writing sequence of the series of data written to the computer before the writing request is received and (2) a count of storage areas at a second storage apparatus that sequentially selects, from among the storage areas when data is received, a storage area to be overwritten by the received data, wherein the second data is to be written to the first storage apparatus and is identical to data that is stored in the storage area to be selected next at the second storage apparatus; and
   transmitting copy data of the first data to the second storage apparatus, when the determined second data has been written to the first storage apparatus.

10. A writing control apparatus comprising a processor configured to:
    receive a writing request to write a first data to a first storage apparatus;
    determine a second data from among a series of data and based on (1) a writing sequence of the series of data written to the computer before the writing request is received and (2) a count of storage areas at a second storage apparatus that sequentially selects, from among the storage areas when data is received, a storage area to be overwritten by the received data, wherein the second data is to be written to the first storage apparatus and is identical to data that is stored in the storage area to be selected next at the second storage apparatus; and
    transmit copy data of the first data to the second storage apparatus, when the determined second data has been written to the first storage apparatus.

11. A system in which a writing control apparatus having access to a first storage apparatus and a second storage apparatus communicate, wherein
    the second storage apparatus includes a processor configured to:

select sequentially from among a plurality of storage areas, when data is received, a storage area to which the received data is to be written, and write the received data to the selected storage area, and the writing control apparatus includes a processor configured to:

receive a writing request to write a first data to a first storage apparatus, determine a second data from among a series of data and based on (1) a count of storage areas at the second storage apparatus and (2) a writing sequence of the series of data written to the computer before the writing request is received, the second data being written to the first storage apparatus and identical to data that is stored in the storage area to be selected next at the second storage apparatus, and transmit copy data of the first data to the second storage apparatus, when the determined second data has been written to the first storage apparatus.

* * * * *